United States Patent
Ho et al.

(10) Patent No.: US 12,526,624 B2
(45) Date of Patent: Jan. 13, 2026

(54) SYSTEM THAT MANAGES ACCESS POINT MULTI-LINK DEVICE WITH MULTIPLE STATIONS

(71) Applicant: QUALCOMM Incorporated, San Diego, CA (US)

(72) Inventors: Sai Yiu Duncan Ho, San Diego, CA (US); George Cherian, San Diego, CA (US); Abhishek Pramod Patil, San Diego, CA (US); Alfred Asterjadhi, San Diego, CA (US); Yanjun Sun, San Diego, CA (US); Jouni Kalevi Malinen, Tuusula (FI)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/517,130

(22) Filed: Nov. 22, 2023

(65) Prior Publication Data

US 2024/0089730 A1 Mar. 14, 2024

Related U.S. Application Data

(63) Continuation of application No. 17/360,060, filed on Jun. 28, 2021, now Pat. No. 11,863,978.
(Continued)

(51) Int. Cl.
*H04W 12/06* (2021.01)
*H04W 12/037* (2021.01)
(Continued)

(52) U.S. Cl.
CPC ..... *H04W 12/0431* (2021.01); *H04W 12/037* (2021.01); *H04W 8/28* (2013.01); *H04W 80/02* (2013.01); *H04W 84/12* (2013.01)

(58) Field of Classification Search
CPC .......... H04W 12/0431; H04W 12/037
(Continued)

(56) References Cited

U.S. PATENT DOCUMENTS 11,228,963 B2  1/2022  Patil et al.
11,510,269 B2  11/2022  Asterjadhi et al.
(Continued)

FOREIGN PATENT DOCUMENTS

CN   203941427 U  * 11/2014  ............. G01D 21/00
CN   111416874 A  *  7/2020  ......... H04L 65/1066
(Continued)

OTHER PUBLICATIONS

Au E., (Huawei): "Specification Framework for TGbe", IEEE P802.11, Wireless LANs, IEEE 802.11-19/1262r11, 41 Pages, Jul. 11, 2020.
(Continued)

*Primary Examiner* — Haresh N Patel
(74) *Attorney, Agent, or Firm* — Loza & Loza LLP

(57) ABSTRACT

This disclosure provides methods, devices and systems that facilitate mobility of wireless communication devices configured for multi-link operation (MLO). Particular aspects more specifically relate to facilitating fast basic service set (BSS) transitions by wireless communication devices that support MLO. For example, some aspects provide support for station (STA) multi-link device (MLD) roaming between access point (AP) MLDs, from an AP MLD to a non-MLO AP, or from a non-MLO AP to an AP MLD. In some aspects, a STA MLD may be configured to use a medium access control (MAC) service access point address (MAC-SAP address) of the AP MLD when re-associating or communicating with a legacy AP or with an AP MLD. In such aspects, the MAC-SAP address may be used by all STAs of the non-AP MLD for fast BSS transitions.

18 Claims, 15 Drawing Sheets

Related U.S. Application Data

(60) Provisional application No. 63/052,802, filed on Jul. 16, 2020.

(51) Int. Cl.
   *H04W 12/0431* (2021.01)
   *H04W 12/08* (2021.01)
   *H04W 8/28* (2009.01)
   *H04W 80/02* (2009.01)
   *H04W 84/12* (2009.01)

(58) Field of Classification Search
   USPC .............................................. 726/2
   See application file for complete search history.

(56) References Cited

U.S. PATENT DOCUMENTS

| | | | | |
|---|---|---|---|---|
| 2014/0136844 | A1* | 5/2014 | Ding | H04W 12/0431 713/168 |
| 2017/0019785 | A1 | 1/2017 | Liu et al. | |
| 2019/0335454 | A1 | 10/2019 | Huang et al. | |
| 2020/0053745 | A1* | 2/2020 | Luo | H04W 72/20 |
| 2020/0137626 | A1 | 4/2020 | Huang et al. | |
| 2020/0221545 | A1* | 7/2020 | Stacey | H04W 84/12 |
| 2020/0383156 | A1 | 12/2020 | Seok et al. | |
| 2020/0404496 | A1 | 12/2020 | Chu et al. | |
| 2020/0413291 | A1 | 12/2020 | Chu et al. | |
| 2021/0007168 | A1 | 1/2021 | Asterjadhi et al. | |
| 2021/0014911 | A1 | 1/2021 | Patil et al. | |
| 2022/0022033 | A1 | 1/2022 | Ho | |

FOREIGN PATENT DOCUMENTS

| | | | |
|---|---|---|---|
| CN | 113891495 A | 1/2022 | |
| EP | 3654703 A1 | 5/2020 | |
| WO | 2011005567 A2 | 1/2011 | |
| WO | WO-2020101752 A1 * | 5/2020 | ............... H04L 1/08 |

OTHER PUBLICATIONS

Taiwan Search Report—TW110123742—TIPO—Sep. 30, 2024.
Au E., (Huawei): "Specification Framework for TGbe", IEEE Draft, 11-19-1262-11-00BE—Specification-Framework-for-TGBE, IEEE-SA, Mentor, Piscataway, NJ, USA, vol. 802.11 EHT, 802.11be, No. 11, Jul. 12, 2020, 41 Pages, XP068169932, paragraph [06.1]-[96.3].
Ho D., (Qualcomm) et al., "MLA Link MAC Addresses Security", IEEE Draft, 11-20-0727-00-00BE-MLA—Link-Mac-Addresses-Security, IEEE-SA Mentor, Piscataway, NJ USA, vol. 802.11 EHT, 802.11be, Jun. 29, 2020, pp. 1-12, XP068172837, p. 2.
Huang P. K. (Intel) et al., "MLD Transition", IEEE Draft, 11-20-0669-00-00BE-MLD—Transition, IEEE-SA Mentor, Piscataway, NJ USA, vol. 802.11 EHT, 802.11be, Jun. 16, 2020, pp. 1-20, XP068169589, The whole document.
International Search Report and Written Opinion—PCT/US2021/039675—ISA/EPO—Nov. 29, 2021.
Partial International Search Report—PCT/US2021/039675—ISA/EPO—Oct. 6, 2021.

* cited by examiner

SYSTEM THAT MANAGES ACCESS POINT MULTI-LINK DEVICE WITH MULTIPLE STATIONS

CROSS-REFERENCE TO RELATED APPLICATIONS

This application for patent is a continuation of patent application Ser. No. 17/360,060 entitled "Fast Basic Service Set Transition For Multi-Link Operation" filed in the United States Patent and Trademark Office on Jun. 28, 2021, which issued as U.S. Pat. No. 11,863,978 on Jan. 2, 2024, and which claims priority to and the benefit of Provisional Patent Application No. 63/052,802 filed in the United States Patent and Trademark Office on Jul. 16, 2020, the entire content of these applications being incorporated herein by reference as if fully set forth below in its entirety and for all applicable purposes.

TECHNICAL FIELD

This disclosure relates generally to wireless communication, and more specifically, to techniques for enabling fast transitions between basic service sets by wireless communication devices configured for multi-link operation.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Some wireless communication devices may be capable of multi-link operation (MLO), that is, may be capable of simultaneously supporting multiple communication links with another MLO-capable device. Such MLO-capable devices, also referred to as multi-link devices (MLDs), are distinguished from legacy devices that support only one link, also referred to herein as non-MLO-capable (or simply "non-MLO") devices or single-link devices (SLDs). For example, an AP MLD may include multiple AP instances (also referred to herein simply as "APs") each configured to communicate on a respective communication link. A non-AP MLD (also referred to as a "STA MLD") may similarly include multiple STA instances (also referred to herein simply as "STAs") each configured to communicate with a respective AP instance of the AP MLD using a respective one of the communication links. Each of the communication links may be provided in the same band or in different bands. There is an ongoing need to provide improved support for MLDs, including support for mobility, such as non-AP MLD roaming between AP MLDs, from an AP MLD to a non-MLO-capable AP, or from a non-MLO-capable AP to an AP MLD.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication by a non-access point (non-AP) multi-link device (non-AP MLD). The method includes transmitting, by a first station of a plurality of stations of the non-AP MLD to a first AP MLD, an initial association request to initiate an association between the non-AP MLD and the first AP MLD, receiving, from the first AP MLD, a first response to the initial association request indicating establishment of a secret key shared by the non-AP MLD and the first AP MLD, generating a first pairwise master key (PMK) based on the secret key, transmitting, by a second station of the plurality of stations of the non-AP MLD to a first target AP, a first reassociation request based on the first response to the initial association request, generating a second PMK based on the first PMK, a first address that is a medium access control (MAC) service access point (MAC-SAP) address that uniquely identifies the non-AP MLD in a wireless local area network (WLAN), and a second address that is a MAC address of the first target AP, receiving from the first target AP, a second response to the first reassociation request, and associating with the first target AP based on the second PMK when the second response to the first reassociation request is based on the second PMK.

Another innovative aspect of the subject matter described in this disclosure can be implemented in a method for wireless communication by an AP MLD includes receiving an initial association request to initiate an association between a non-AP MLD and the AP MLD from a first station of a plurality of stations of the non-AP MLD, establishing a secret key shared with the non-AP MLD based on the initial association request, transmitting, by the AP MLD to the first station, a response to the initial association request indicating the establishment of the secret key, generating a first PMK based on the secret key, receiving, from a second station of the plurality of stations of the non-AP MLD through a first target AP in the AP MLD, a first reassociation request after the response to the initial association request is transmitted, generating a second PMK based on the first PMK, a first address that is a MAC-SAP address that uniquely identifies the non-AP MLD in a WLAN, and a second address that is a MAC address of the first target AP, transmitting, by the AP MLD to the second station, a response to the first reassociation request, the response being based on the second PMK.

Another innovative aspect of the subject matter described in this disclosure can be implemented in a method for communication by a wireless network controller includes receiving, from an AP MLD, a first PMK and an address of a non-AP MLD, where the first PMK is generated during an initial association of the AP MLD with a first station of the non-AP MLD, receiving a message indicating a first address that is a MAC-SAP address that uniquely identifies the non-AP MLD in a wireless local area network (WLAN) and a second address that is a MAC address of a first target AP in the AP MLD, where the message is received in relation to a first reassociation request received at the first target AP, generating a second PMK based on the first PMK, the first address and the second address, and transmitting the second PMK to the AP MLD for use in associating the AP MLD with a second station of the non-AP MLD.

Another innovative aspect of the subject matter described in this disclosure can be implemented in a wireless communication device. The wireless communication device includes at least one modem, at least one processor communicatively coupled with the at least one modem and at least one memory communicatively coupled with the at least one processor. The wireless communication device may include at least one transceiver coupled to the at least one modem, at least one antenna coupled to the at least one transceiver to wirelessly transmit signals output from the at least one transceiver and to wirelessly receive signals for input into the at least one transceiver and a housing that encompasses the at least one modem, the at least one processor, the at least one memory, the at least one transceiver and at least a portion of the at least one antenna.

In some implementations, the first address differs from a MAC address that uniquely identifies the first station. The first address may be different from a MAC address that uniquely identifies the second station. The second station may have a MAC address that differs from a MAC address that uniquely identifies the first station.

In some implementations, the methods and wireless communication devices may be configured to generate a pairwise transient key (PTK) based on the second PMK, encrypt data to be transmitted to the second AP based on the PTK and transmit encrypted data to the first target AP.

In some implementations, a third station of the plurality of stations of the non-AP MLD may be configured to transmit a reassociation request to a second target AP. A third PMK may be generated based on the first PMK, the MAC-SAP address, and a third address that is a MAC address of the second target AP. A third response to the second reassociation request may be received from the second target AP, the third response to the second reassociation request being based on the third PMK. An association with the second target AP may be based on the third PMK responsive to the third response to the second reassociation request. The first target AP may be an AP of the first AP MLD and the second target AP is an AP of a second AP MLD that differs from the first AP MLD. The first target AP and the second target AP may be APs of the first AP MLD. The third target AP may comprise a non-multi-link operation (non-MLO) AP.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Like reference numbers and designations in the various drawings indicate like elements.

DETAILED DESCRIPTION

Figure 1:
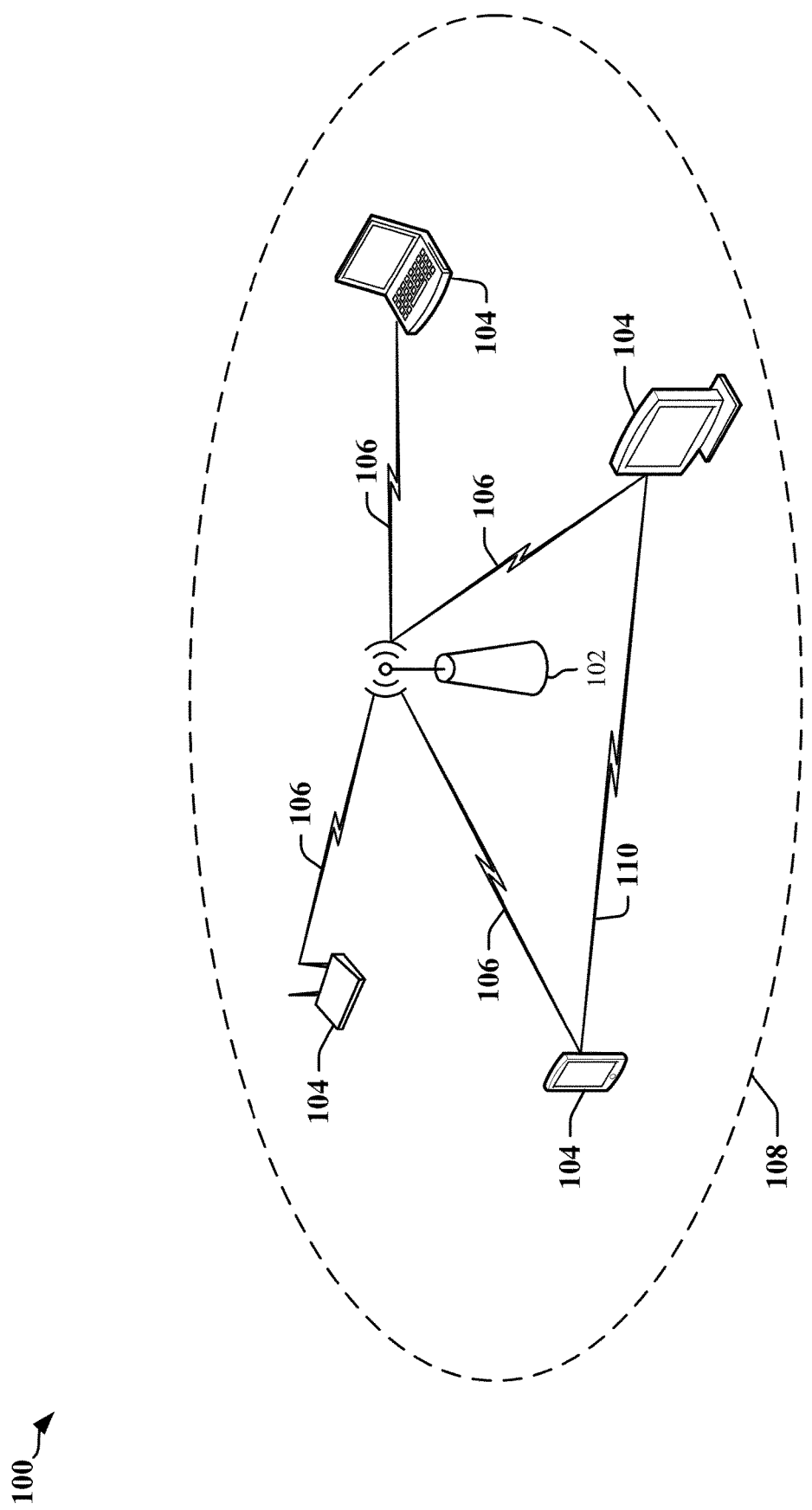
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3 rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU)-MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to facilitating mobility of wireless communication devices configured for multi-link operation (MLO). Some aspects more specifically relate to mobility within or between wireless communication networks that may include a combination of access point (AP) multi-link devices (AP MLDs), non-multi-link operation (non-MLO) access points (non-MLO APs), non-access point (non-AP) multi-link devices (non-AP MLDs), also referred to as wireless station (STA) multi-link devices (STA MLDs), and non-MLO STAs. Particular aspects more specifically relate to facilitating fast basic service set (BSS) transitions by wireless communication devices, such as by non-AP MLDs, that support MLO. For example, some aspects provide support for non-AP MLD roaming between AP MLDs, from an AP MLD to a non-MLO AP, or from a non-MLO AP to an AP MLD. In some aspects, a non-AP MLD may be configured to use the medium access control (MAC) service access point (MAC-SAP) address of the AP MLD during a fast BSS transition (also referred to herein as an "FT" or simply a fast transition) when re-associating or communicating with an AP MLD or with a legacy AP. In such aspects, the MAC-SAP address may be used by all STAs of the non-AP MLD for fast BSS transitions.

Some aspects more specifically relate to the use of the MAC-SAP address configured for the non-AP MLD during FTs to identify the non-AP MLD as a keyholder, which enables an AP MLD to retrieve a correct context during an FT regardless of which of its STAs the non-AP MLD uses to initiate the FT. Each of the AP MLD and the non-AP MLD may be associated with multiple identities. The AP MLD connects directly to other AP MLDs associated with the WLAN (or other components of the WLAN) and is known to these AP MLDs and other components of the WLAN through the MAC-SAP address of the non-AP MLD. Each AP of the AP MLD is configured with a respective MAC address that is typically known only to the respective AP MLD, not to STAs or other wireless communication devices of the BSS or WLAN. As such, these MAC addresses cannot be used for conventional FT operations. However, in some aspects disclosed herein, legacy FT procedures can be leveraged or reused to support fast BSS transitions by a non-AP MLD including when the non-AP MLD roams between an AP MLD and a legacy AP.

Particular implementations of the subject matter described in this disclosure can be implemented to realize one or more of the following potential advantages. In some implementations, the described techniques can be used to reestablish existing security or quality-of-service (QoS) parameters for a roaming non-AP MLD while re-associating one or more STAs of the non-AP MLD through a different AP. The described techniques may significantly reduce the duration of interrupted network services experienced by a non-AP MLD when the non-AP MLD is connecting to the different AP. More specifically, the key hierarchy defined when the non-AP MLD is initially associated with a network through a first STA of the non-AP MLD can be used for an FT initiated by the non-AP MLD regardless of which of its STAs the non-AP MLD uses during the FT, which obviates the need to reestablish a key hierarchy that would otherwise be required when the non-AP MLD uses a second, different STA to initiate the FT. The resultant reduction in handshaking while roaming can reduce handoff times while maintaining security and QoS, including for delay-sensitive multimedia, voice or video applications. Furthermore, some of the described techniques enabling fast BSS transition for MLO may be implemented using techniques associated with, or adaptations thereof, conventional FT standards or protocols.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11 ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct wireless link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11 ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or CCC20 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figures 2A, 2B:
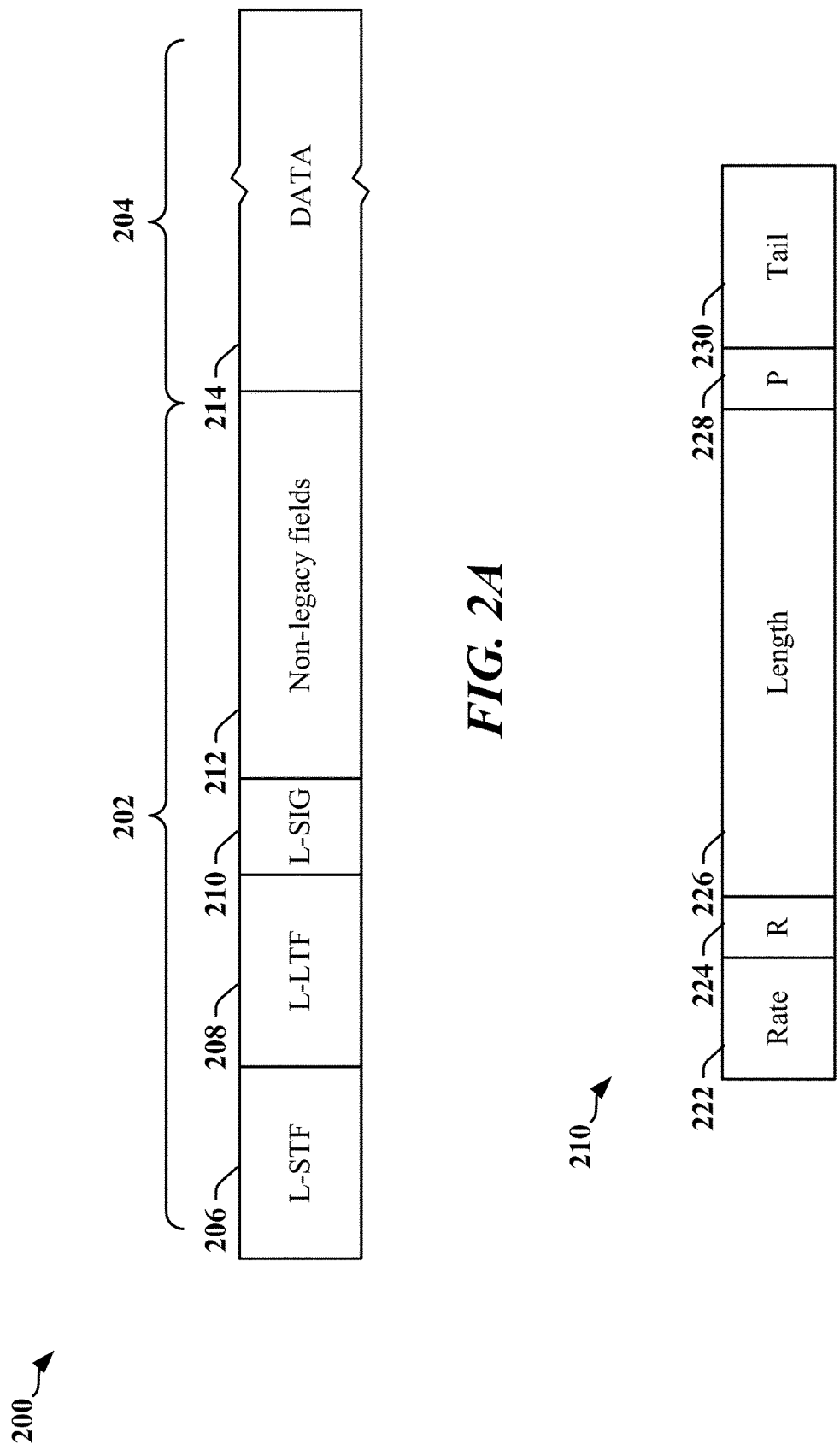
FIGS. 2A and 2B show an example protocol data unit (PDU) usable for communications between an access point (AP) and one or more stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3:
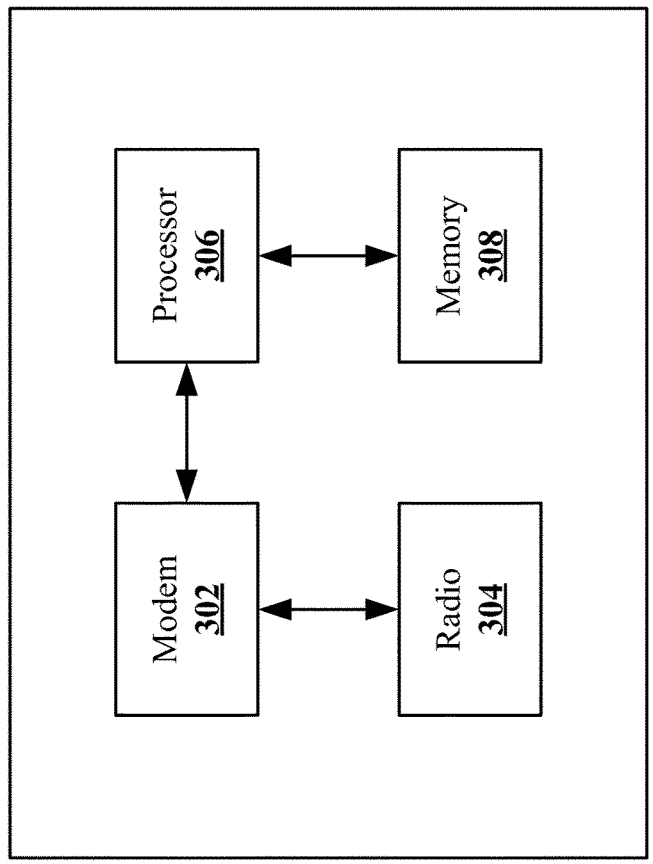
FIG. 3 shows a block diagram of an example wireless communication device.

FIG. 3 shows a block diagram of an example wireless communication device 300. In some implementations, the wireless communication device 300 can be an example of a device for use in a STA such as one of the STAs 104 described above with reference to FIG. 1. In some implementations, the wireless communication device 300 can be an example of a device for use in an AP such as the AP 102 described above with reference to FIG. 1. The wireless communication device 300 is capable of transmitting and receiving wireless communications in the form of, for example, wireless packets. For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 300 can be, or can include, a chip, system on chip (SoC), chipset, package or device that includes one or more modems 302, for example, a Wi-Fi (IEEE 802.11 compliant) modem. In some implementations, the one or more modems 302 (collectively "the modem 302") additionally include a WWAN modem (for example, a 3GPP 4G LTE or 5G compliant modem). In some implementations, the wireless communication device 300 also includes one or more processors, processing blocks or processing elements (collectively "the processor 304") coupled with the modem 302. In some implementations, the wireless communication device 300 additionally includes one or more radios 306 (collectively "the radio 306") coupled with the modem 302. In some implementations, the wireless communication device 300 further includes one or more memory blocks or elements (collectively "the memory 308") coupled with the processor 304 or the modem 302.

The modem 302 can include an intelligent hardware block or device such as, for example, an application-specific integrated circuit (ASIC), among other examples. The modem 302 is generally configured to implement a PHY layer, and in some implementations, also a portion of a MAC layer (for example, a hardware portion of the MAC layer). For example, the modem 302 is configured to modulate packets and to output the modulated packets to the radio 306 for transmission over the wireless medium. The modem 302 is similarly configured to obtain modulated packets received by the radio 306 and to demodulate the packets to provide demodulated packets. In addition to a modulator and a demodulator, the modem 302 may further include digital signal processing (DSP) circuitry, automatic gain control (AGC) circuitry, a coder, a decoder, a multiplexer and a demultiplexer. For example, while in a transmission mode, data obtained from the processor 304 may be provided to an encoder, which encodes the data to provide coded bits. The coded bits may then be mapped to a number Nss of spatial streams for spatial multiplexing or a number Ns's of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 306. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 306, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 304) for processing, evaluation or interpretation.

The radio 306 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 300 can include, or be coupled with, multiple transmit antennas (each with a corresponding transmit chain) and multiple receive antennas (each with a corresponding receive chain). The symbols output from the modem 302 are provided to the radio 306, which then transmits the symbols via the coupled antennas. Similarly, symbols received via the antennas are obtained by the radio 306, which then provides the symbols to the modem 302.

The processor 304 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 304 processes information received through the radio 306 and the modem 302, and processes information to be output through the modem 302 and the radio 306 for transmission through the wireless medium. For example, the processor 304 may implement a control plane and at least a portion of a MAC layer configured to perform various operations related to the generation, transmission, reception and processing of MPDUs, frames or packets. In some implementations, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some implementations, the processor 304 may generally control the modem 302 to cause the modem to perform various operations described above.

The memory 308 can include tangible storage media such as random-access memory (RAM) or read-only memory (ROM), or combinations thereof. The memory 308 also can store non-transitory processor- or computer-executable software (SW) code containing instructions that, when executed by the processor 304, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 4B:
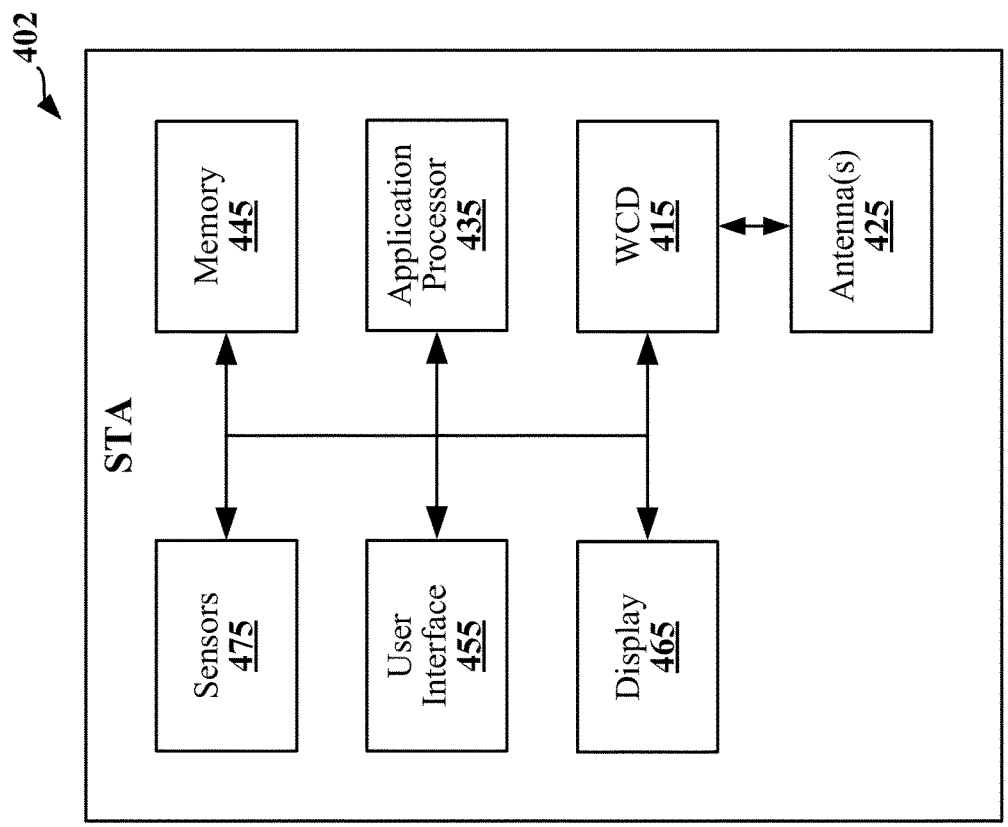
FIGS. 4A and 4B shows a block diagram illustrating an example AP and an example STA.
Figure 4A:
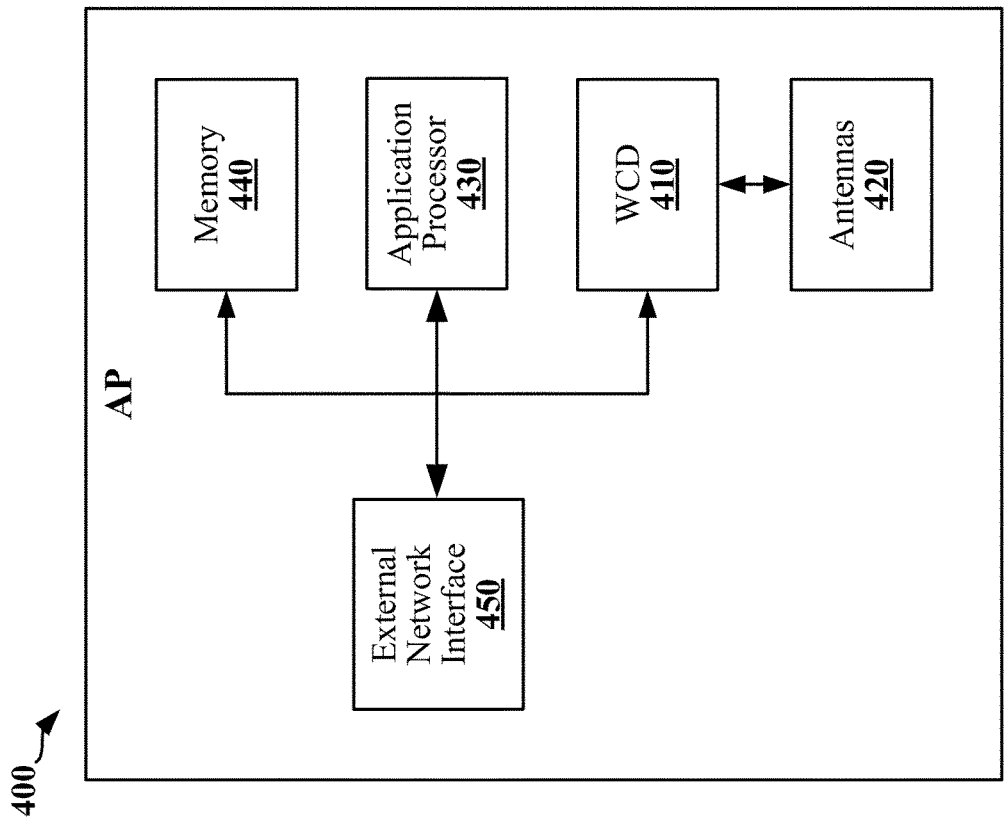

FIG. 4A shows a block diagram of an example AP 400. For example, the AP 400 can be an example implementation of the AP 102 described with reference to FIG. 1. The AP 400 includes a wireless communication device (WCD) 410 (although the AP 400 may itself also be referred to generally as a wireless communication device as used herein). For example, the wireless communication device 410 may be an example implementation of the wireless communication device 300 described with reference to FIG. 3. The AP 400 also includes multiple antennas 420 coupled with the wireless communication device 410 to transmit and receive wireless communications. In some implementations, the AP 400 additionally includes an application processor 430 coupled with the wireless communication device 410, and a memory 440 coupled with the application processor 430. The AP 400 further includes at least one external network interface 450 that enables the AP 400 to communicate with a core network or backhaul network to gain access to external networks including the Internet. For example, the external network interface 450 may include one or both of a wired (for example, Ethernet) network interface and a wireless network interface (such as a WWAN interface). Ones of the aforementioned components can communicate with other ones of the components directly or indirectly, over at least one bus. The AP 400 further includes a housing that encompasses the wireless communication device 410, the application processor 430, the memory 440, and at least portions of the antennas 420 and external network interface 450.

FIG. 4B shows a block diagram of an example STA 402. For example, the STA 402 can be an example implementation of the STA 104 described with reference to FIG. 1. The STA 402 includes a wireless communication device 415 (although the STA 402 may itself also be referred to generally as a wireless communication device as used herein). For example, the wireless communication device 415 may be an example implementation of the wireless communication device 300 described with reference to FIG. 3. The STA 402 also includes one or more antennas 425 coupled with the wireless communication device 415 to transmit and receive wireless communications. The STA 402 additionally includes an application processor 435 coupled with the wireless communication device 415, and a memory 445 coupled with the application processor 435. In some implementations, the STA 402 further includes a user interface (UI) 455 (such as a touchscreen or keypad) and a display 465, which may be integrated with the UI 455 to form a touchscreen display. In some implementations, the STA 402 may further include one or more sensors 475 such as, for example, one or more inertial sensors, accelerometers, temperature sensors, pressure sensors, or altitude sensors. Ones of the aforementioned components can communicate with other ones of the components directly or indirectly, over at least one bus. The STA 402 further includes a housing that encompasses the wireless communication device 415, the application processor 435, the memory 445, and at least portions of the antennas 425, UI 455, and display 465.

As described above, wireless communication devices (MLDs) that are capable of multi-link operation (MLO), that is, capable of simultaneously supporting multiple communication links with another MLO-capable device can be distinguished from legacy devices that support only one link, which may be referred to herein as non-MLO-capable devices, non-MLO devices or single-link devices (SLDs). An access point capable of multi-link operation may be referred to as an AP MLD and may include multiple AP instances (also referred to herein simply as "APs"), each configured to communicate on a respective communication link. A non-AP MLD may be referred to as a station MLD or "STA MLD" and may include multiple station (STA) instances (also referred to herein simply as "STAs"), each configured to communicate with a respective AP instance of the AP MLD using a respective one of the communication links. Each of the communication links may be provided in the same band or in different bands. To improve data throughput, the non-AP MLD may communicate with the AP MLD concurrently over the multiple communication links For example, a first AP of the AP MLD may communicate with a first STA of the non-AP MLD over a first communication link in the 2.4 GHz band, a second AP of the AP MLD may communicate (potentially concurrently with the communication via the first communication link) with a second STA of the non-AP MLD over a second communication link in the 5 GHz band, and a third AP of the AP MLD may communicate (potentially concurrently with the communication via the first or second communication links) with a third STA of the non-AP MLD over a third communication link in the 6 GHz band.

According to certain aspects of this disclosure, legacy fast transfer procedures can be leveraged or reused to support fast BSS transitions by a non-AP MLD including when the non-AP MLD roams between an AP MLD and legacy AP. In some examples, a non-AP MLD may be configured to use the MAC-SAP address of the AP MLD during FTs when re-associating or communicating with a legacy AP or with an AP MLD including for the purpose of identifying the non-AP MLD as the keyholder that enables an AP MLD to retrieve the correct context during FTs, regardless of which of its STAs the non-AP MLD uses to initiate the FT. An AP MLD and the non-AP MLD may be associated with multiple identities. The AP MLD connects directly to other AP MLDs associated with the WLAN or other components of the WLAN and is known to these AP MLDs and other components of the WLAN through the MAC-SAP address of the non-AP MLD.

Standardized FT procedures can be leveraged or reused to support fast BSS transitions by a non-AP MLD when the non-AP MLD roams between an AP MLD and legacy AP. For single-link operation, the IEEE 802.11r amendment to the IEEE 802.11 family of standards defines an FT mechanism to enable fast secure roaming that may also be known as a fast BSS transition. If enabled for FT, a STA (such as a mobile device) associated with an AP can reestablish existing security or QoS parameters prior to re-associating with a new AP.

Conventionally, FT provides for an initial handshake between a STA (supplicant) and an AP (authenticator) before the STA roams to a target AP that serves as an authenticator for the FT. The initial handshake includes an advance Pairwise Transient Key (PTK) calculation, where the PTK keys are used by the STA and newly-associated AP after an association or reassociation request and response exchange have been completed. The initial handshake may further include a Group Transient Key (GTK) that is shared among all supplicants connected to the same authenticator. The GTK may be used for secure multicast/broadcast traffic. The FT key hierarchy is configured to permit the STA to make fast BSS transitions between APs without requiring re-authentication for each transition. The resultant reduction in handshaking while roaming can reduce handoff times while maintaining security and QoS, including for delay-sensitive multimedia, voice or video applications.

FT may be employed in strongly secure WLANs, including WLANs that employ IEEE 802.1x and Extensible Authentication Protocol (EAP) methods for authentication. FT can reestablish parameters that are established during an information exchange during an FT initial mobility domain association between the STA, which may be referred to as the FT Originator (FTO), and an AP. Reassociations through other APs within the same mobility domain can subsequently be executed using the FT protocols. Efficiency and speed of transition can be obtained by eliminating the need for the STA to re-execute the complete association procedures during each transition. For example, the IEEE 802.11r defines mechanisms that can remove the burden of negotiating some security and QoS parameters during the handoff procedure. FT provides a mechanism that permits transitions to be authenticated using a basic four-message exchange, and a 4-way handshake of session keys to create a unique encryption key for the association between the STA and a target AP using a master key (PMK) established during an initial association between the STA and an AP of the network. The association or context between the STA and the target AP (supplicant and authenticator) may be referred to as a Pairwise Transient Key Security Association (PTKSA).

A multi-layer hierarchy of PMKs may be defined for FT. In some examples, a first layer key of the hierarchy (PMK-R0) may be held by a WLAN controller, a second layer key of the hierarchy (PMK-R1) may be held by an AP, and a Pairwise Transit Key (PTK) at the third layer key of the hierarchy. PMK is derived from a master session key (MSK) that is used to encrypt data frames and PMK-R0 is derived from PMK. PMK-R1 is derived from PMK-R0 and provided by the WLAN controller to APs managed by the WLAN controller. PMK-R1 is used to derive the PTKs that are used to encrypt data.

Figure 5:
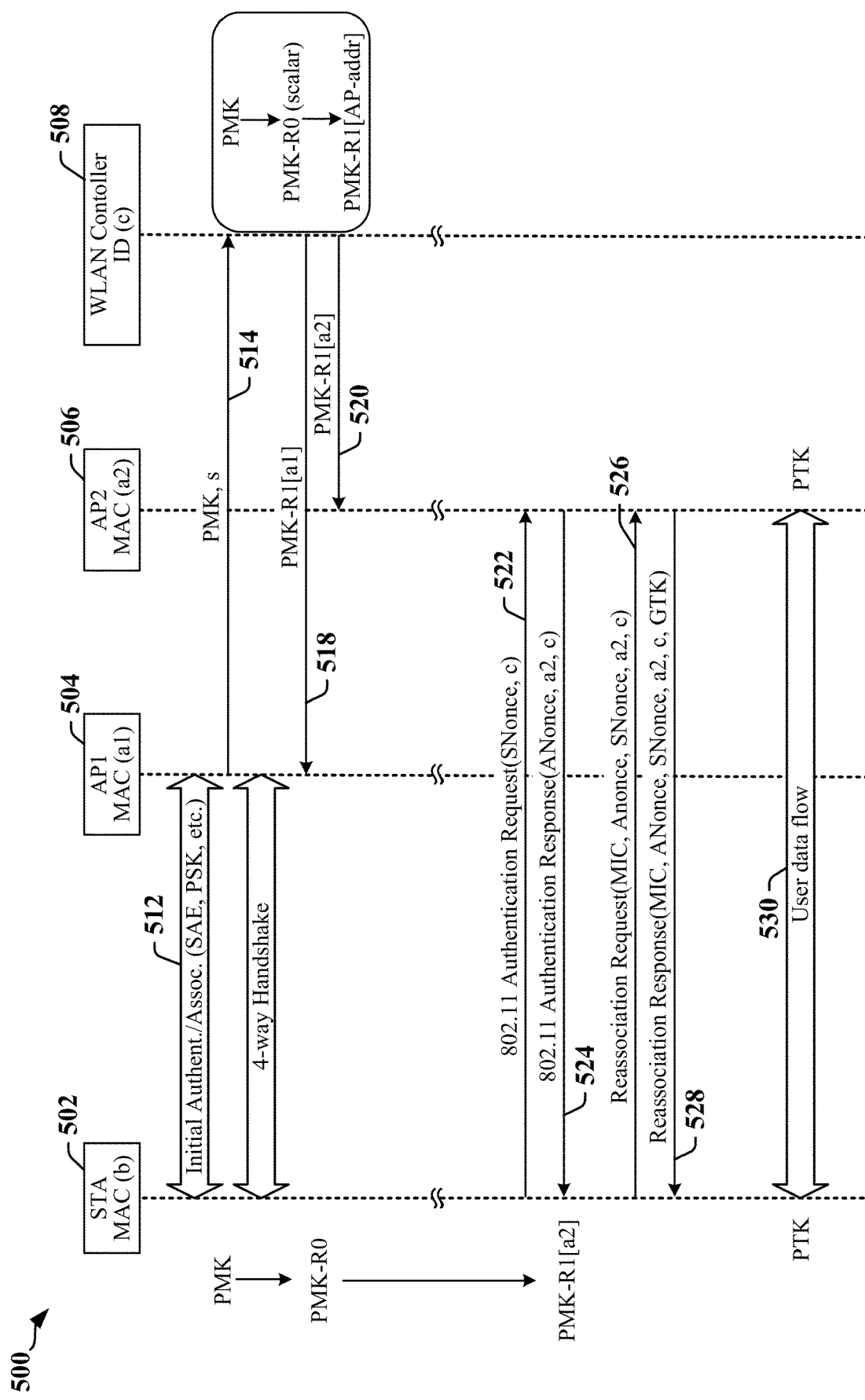
FIG. 5 shows an example message flow associated with a fast Basic Service Set (BSS) transition for single-link operation according to some aspects.

FIG. 5 shows an example message flow 500 associated with a fast BSS transition for single-link operation according to some aspects. The message flow 500 involves a STA 502, a first AP (AP1 504), a second AP (AP2 506) and a WLAN controller 508. An initial authentication/association procedure 512 may be executed between the STA 502 and AP1 504, from which a PMK is generated. The initial authentication/association procedure 512 may be performed using a pre-shared key (PSK) or a secure key establishment protocol such as a Simultaneous Authentication of Equals (SAE) protocol, for example. An authentication server may participate in the initial authentication/association procedure 512. The PMK is maintained by the STA 502 and AP1 504. The STA 502 and AP1 504 may exchange additional keys, including keys (PTK and GTK) used to secure data traffic.

The AP1 504 sends the PMK to the WLAN controller 508 in a message 514 that includes the PMK and the MAC address of the STA 502. The WLAN controller 508 generates PMK-R0 based on the PMK provided in the message 514. In some examples, PMK-R0 is a scalar and the WLAN controller 508 uses a cryptographic hash function such as a key derivation function (KDF) to obtain PMK-R1. The WLAN controller 508 generates a vector for the STA 502, where the vector includes an element for each AP, including AP1 504 and AP2 506 controlled by the WLAN controller 508. For example, the WLAN controller 508 may generate a vector of n elements that be denoted as {PMK-R1[a1], PMK-R1[a2] PMK-R1[a n] }, and where each element of the vector is provided to a corresponding one of the APs controlled by the WLAN controller 508. In the illustrated example, PMK-R1 [a1] is generated for AP1 504 and PMK-R1 [a2] is generated for AP2 506.

In some examples, PMK–R0 is generated using the KDF hash-length function:

$$PMK\text{-}R0 = KHL(PMK, SSID, c, b, \ldots).$$

Each $PMK\text{-}R1$ may be generated using the $KDF$ hash-length function:

$$PMK\text{-}R1[an] = KHL(PMK\text{-}R0, a_n, b, \ldots),$$

where $a_n$ represents the address or identifier of AP1 504 or AP2 506, and b represents the address or identifier of the STA 502.

The WLAN controller 508 sends a message 518 and a message 520 to AP1 504 and AP2 506, respectively, to provide the corresponding PMK-R1 key. Each of AP1 504 and AP2 506 can use its PMK-R1 key for the STA 502 when responding to an association or reassociation request by the STA 502. For example, at some point in time after the STA 502 has initially established a link with AP1 504, the STA 502 may attempt to re-associate with the network through AP2 506. The STA 502 may send an authentication request message 522 to AP2 506 and, upon receiving an authentication response message 524 from AP2 506, the STA 502 may generate the PMK-R1 [a2] key that matches the PMK-R1 [a2] key generated by the WLAN controller 508 and provided to AP2 506 after the initial association of the STA 502 with AP1 504. The STA 502 may send a reassociation request in a message 526 to AP2 506 with a message integrity check (MIC), an authenticator Nonce (ANonce) received in the authentication response message 524 and a supplicant Nonce (SNonce) that was sent by the STA 502 in the authentication request message 522. Upon confirmation of reassociation provided in a reassociation response 528, the PMK-R1[a2] key may be used to generate a PTK and a GTK that may be used to secure a data flow 530 between the STA 502 and AP2 506.

The WLAN controller 508 serves as the authenticator during the initial handshake and may include a PMK–R0 key holder (R0KH) component that holds PMK-R0. The STA 502 is the supplicant during the initial handshake and may include a PMK-S0 key holder (S0KH) component that holds supplicants copy of the PMK-R0. The S0KH component may derive a PMK-R1 which may be held in an S1 key holder (S1KH) component. The S1KH component derives PTKs. The S0KH component may be identified by an identifier (S0KH-ID).

Figure 6:
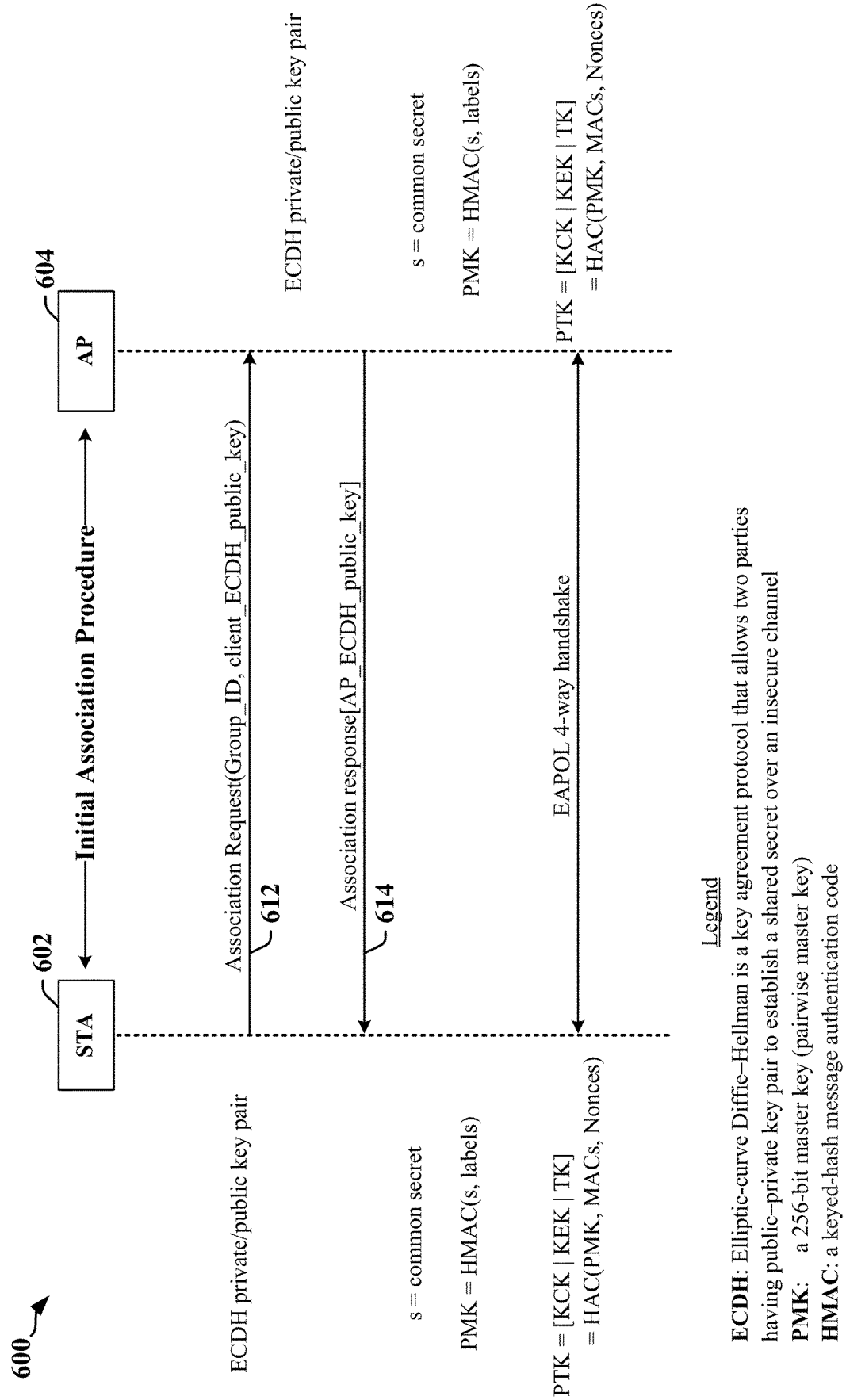
FIG. 6 shows an example initial association procedure that may be performed as part of the message flow illustrated in FIG. 5.

FIG. 6 shows an example initial association procedure 600 that may be performed as part of the message flow illustrated in FIG. 5. The initial association procedure may be performed by a STA 602 and an AP 604. The initial association procedure 600 may be used to generate a PMK. The STA 602 may transmit an association request 612 to the AP 604, the association request 612 including a public key associated with the STA 602. The public key may be part of a public/private key pair defined for use in an Elliptic-curve Diffie—Hellman (ECDH) procedure that permits a shared secret (such as a secret key) to be shared between the STA 602 and AP 604 over an insecure channel. The AP 604 returns an association response 614 to the STA 602. The association response 614 may include the public key of an ECDH key pair associated with the AP 604. The exchange establishes a secret (such as a secret key or keys) between the STA 602 and AP 604 that can be used by the STA 602 and AP 604 to generate a 256-bit keyed-hash message authentication code (HMAC) that serves as the PMK.

Figure 7:
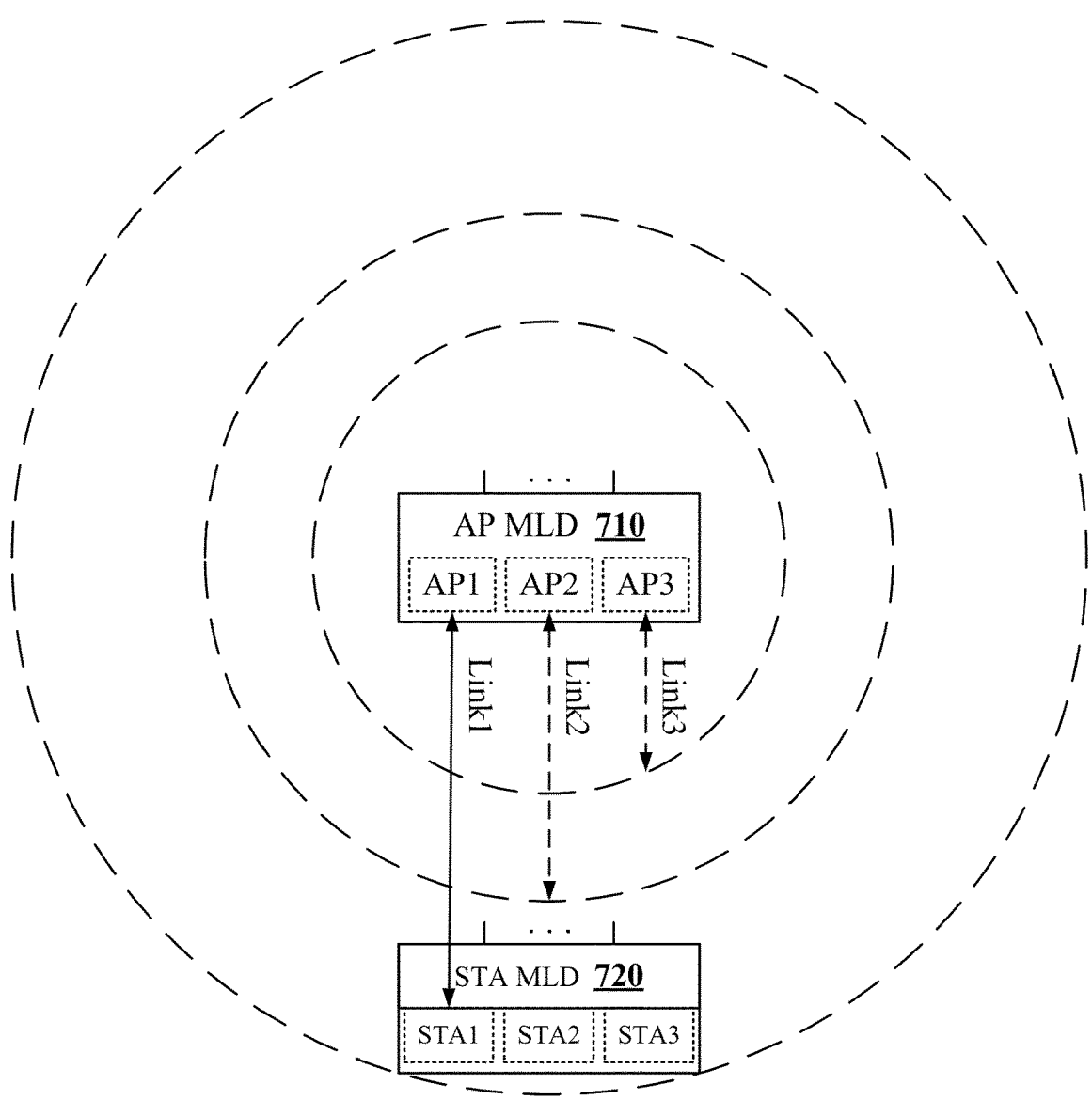
FIG. 7 shows an example multi-link wireless communication system according to some aspects.

FIG. 7 shows an example multi-link wireless communication system 700 according to some aspects. The wireless communication system 700 includes an AP MLD 710 and a STA MLD 720. In some implementations, the AP MLD 710 may be an example of any of the APs 102 or 400 of FIGS. 1 and 4, respectively. In some implementations, the STA MLD 720 may be an example of any of the STAs 104 or 402 of FIGS. 1 and 4, respectively.

The AP MLD 710 includes multiple APs AP1, AP2, and AP3 associated with communication links Link1, Link2, and Link3, respectively. In the example of FIG. 7, the AP MLD 710 is shown to include only three APs. However, in other implementations, the AP MLD 710 may include fewer or more APs than those depicted in FIG. 7. The APs AP1—AP3 share a common association context (through the AP MLD 710), but each AP may establish a respective BSS on its associated communication link. The APs AP1—AP3 also may establish their respective communication links Link1-Link3 on different respective frequency bands. For example, AP1 may operate on the 2.4 GHz frequency band, AP2 may operate on the 5 GHz frequency band, and AP3 may operate on the 6 GHz frequency band.

Certain aspects of the subject matter described in this disclosure relate to techniques that can be used to reestablish existing security or QoS parameters for a roaming non-AP MLD while re-associating one or more STAs of the non-AP MLD through a new AP. In some examples, the key hierarchy defined when the non-AP MLD is initially associated with a network through a first STA of the non-AP MLD can be used for fast transition initiated by the non-AP MLD regardless of which of its STAs the non-AP MLD uses during the fast transition, obviating the need to reestablish a key hierarchy when the non-AP MLD uses a second, different STA to initiate fast transition.

Figure 8:
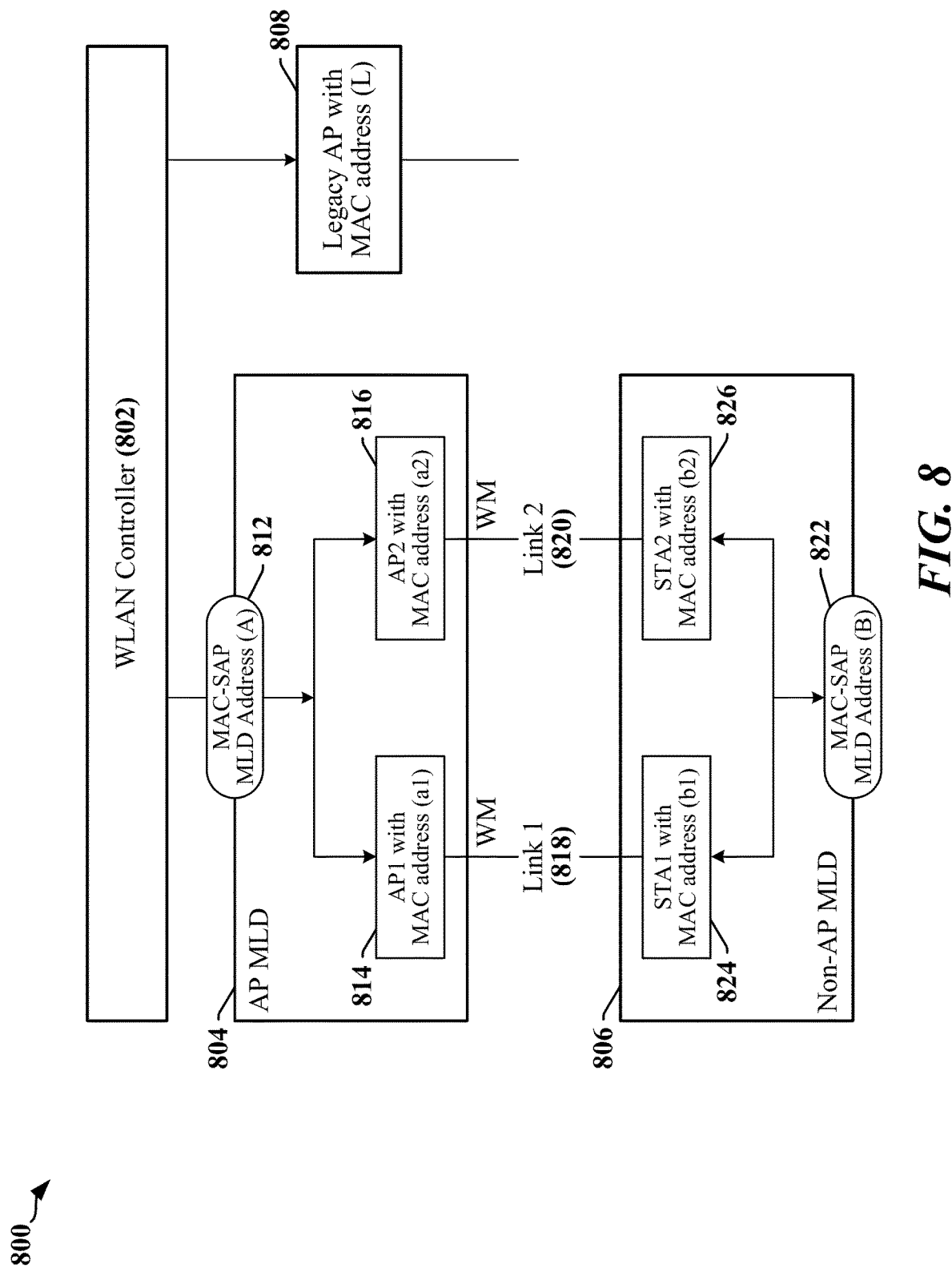
FIG. 8 shows an example multi-link architecture that supports fast BSS transitions by a non-access point (non-AP) multi-link device (non-AP MLD) according to some aspects.

FIG. 8 shows an example multi-link architecture 800 that supports fast BSS transitions by a non-AP MLD 806 according to some aspects. In the illustrated example, an AP MLD 804 includes two APs 814 and 816 associated with respective communication links (Link1 818 and Link2 820). In some implementations, the AP MLD 804 may be an example of any of the APs 102 or 400 of FIGS. 1 and 4, respectively. The AP MLD 804 is shown to include only two APs 814 and 816 although, in other implementations, the AP MLD 804 may include more than two APs. A non-AP MLD 806 includes two STAs 824 and 826 associated with Link 1 818 and Link2 820, respectively. In some implementations, the non-AP MLD 806 may be an example of any of the STAs 104 or 402 of FIGS. 1 and 4, respectively. The non-AP MLD 806 is shown to include only two STAs 824 and 826 although, in other implementations, the non-AP MLD 806 may include more than two STAs.

The AP MLD 804 and the non-AP MLD 806 are each associated with multiple identities. The AP MLD 804 is known to the WLAN controller 802, and thereby known to the WLAN, through a MAC service access point address (MAC-SAP address 812), here identified as address 'A'. In some implementations, the MAC-SAP address 812 is 48 bits (6 octets) in length. Each of the APs 814 and 816 may be configured with a respective MAC address used to establish Link1 818 and Link2 820, respectively. In the illustrated example, the MAC addresses for the APs 814 and 816 are identified as addresses 'a1' and 'a2', respectively. In some implementations, the MAC addresses are 48 bits (6 octets) in length. In some implementations, the MAC addresses are unknown to the WLAN controller 802, which communicates through the AP MLD 804 using the MAC SAP address.

The non-AP MLD 806 is known to the WLAN controller 802, and thereby known to the WLAN, using a corresponding MAC-SAP address 822. In the illustrated example, the MAC-SAP address 822 is identified as address '13'. In some implementations, the MAC SAP address is 48 bits (6 octets) in length. Each of the STAs 824 and 826 may be configured with a respective MAC address used to establish Link1 818 and Link2 820, respectively. In the illustrated example, the MAC addresses for the STAs 824, 826 are identified as addresses 1)1' and '1)2', respectively. In some implementations, the MAC addresses are 48 bits (6 octets) in length. In some implementations, the MAC addresses are unknown to the WLAN controller 802, which uses the '13' MAC-SAP address to communicate with the non-AP MLD 806.

The use of MAC addresses to establish Link1 818 and Link2 820 can render conventional FT protocols inoperative for re-associating one or more of the STAs 824 or 826 in the non-AP MLD 806 with a different second AP MLD or with a legacy AP 808. Fast BSS transition can be accomplished when keys, including PMK-0 can be associated with the transitioning devices. A conventional target AP MLD that receives a reassociation request from one of the STAs 824 or 826 is unable to relate the MAC address of the STA 824 or 826 with the MAC-SAP address used by the corresponding non-AP MLD 806 and the target AP MLD is unable to retrieve or generate the encryption keys needed for FT.

Conventionally, the WLAN controller 802, the second AP MLD and the legacy AP 808 would not recognize the MAC address used in a request for reassociation from the STA 824 or 826. As such, the transitioning non-AP MLD 806 would be required to perform an initial mobility domain association between the STA 824 or 826 and the second AP MLD or the legacy AP 808.

According to some aspects of this disclosure, legacy FT procedures can be leveraged or reused to support fast BSS transitions by a non-AP MLD 806. Referring again to FIG. 8, a multi-link architecture 800 may employ a Split-MAC architecture, in which the implementation of some MAC functions may be divided between an AP MLD 804 and the WLAN controller 802. In some examples, the WLAN controller 802 may be included in the AP MLD 804. In some other examples, the WLAN controller 802 may be included in a different AP MLD. In yet other examples, the WLAN controller 802 may be provided as a standalone device or in another type of network controller. In a Split-MAC architecture, both the supplicant and authenticator use the MSK to derive PMK–R0 and can subsequently derive a PMK–R1 for each of the APs 814 and 816. The supplicant performs an FT 4-Way Handshake with the initial AP MLD 804 to develop the PTKSA for the AP MLD 804.

In some aspects of the disclosure, the MAC-SAP address 822 of the non-AP MLD 806 address is used as the S0KH-ID. The MAC-SAP address 822 is consistently presented as the S0KH-ID regardless of which STA 824 or 826 of the non-AP MLD 806 is used during any subsequent FT. The target AP MLD 804 receives the MAC-SAP address 822 as the S0KH-ID in 802.11 Authentication Request frames enabling the target AP MLD 804 to retrieve the correct FT context.

Figure 9:
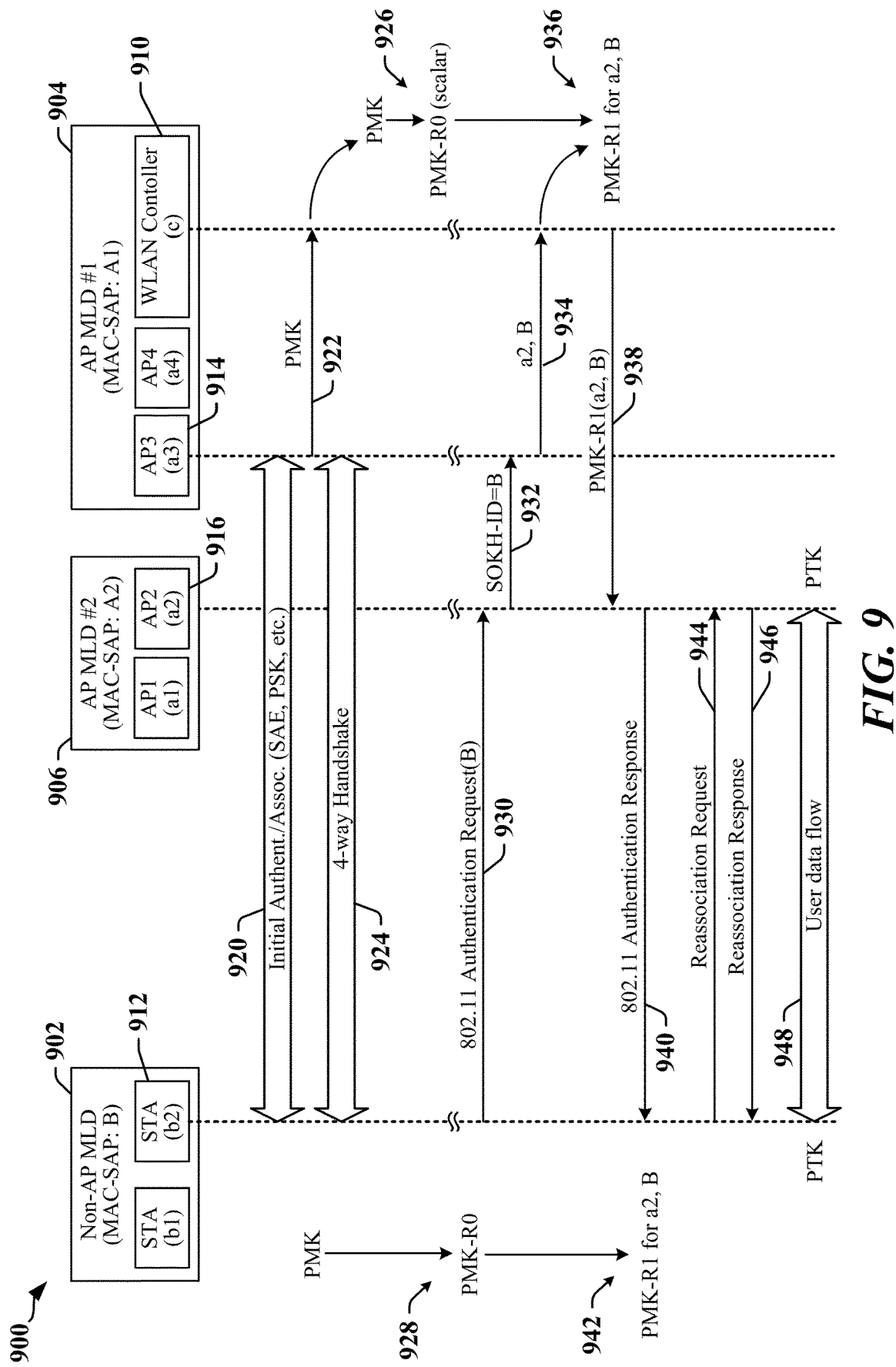
FIG. 9 shows an example message flow associated with a fast multi-link BSS transition for multi-link operation (MLO) according to some aspects.

FIG. 9 shows an example message flow 900 associated with a fast multi-link BSS transition for multi-link operation (MLO) according to some aspects. The message flow 900 illustrates an enhanced and, in some aspects, expanded procedure relative to the single-link FT procedure illustrated in FIG. 5. The message flow 900 relates to a system which includes at least one non-AP MLD 902 and two AP MLDs 904 and 906. The non-AP MLD 902 may be comparable in some respects to the non-AP MLD 806 of FIG. 8 and each of the AP MLDs 904 and 906 may be comparable in some respects to the AP MLD 804 of FIG. 8. Each AP MLD 904, 906 may identify its capabilities in beacon frames, which may indicate MLO capabilities. In the illustrated example, a WLAN controller 910 is included in the first AP MLD 904. The WLAN controller 910 may be comparable in some respects to the WLAN controller 802 of FIG. 8.

The non-AP MLD 902 initially associates with the first AP MLD 904. An initial authentication/association procedure 920 may be executed between the non-AP MLD 902 and the first AP MLD 904. The initial authentication/association procedure 920 may be performed using a PSK or a secure key establishment protocol such as the SAE protocol. In the illustrated example, the non-AP MLD 902 participates in the initial authentication/association procedure 920 through a STA 912 that has a MAC address '1)2'. In the initial authentication/association procedure 920, the STA 912 provides the MAC-SAP address (B) of the non-AP MLD 902 in an 802.11 authentication request, and the MAC-SAP address of the non-AP MLD 902 is used as the S0KH-ID for subsequent FT procedures initiated by the non-AP MLD 902.

An authentication server may participate in the initial authentication/association procedure 920. The initial authentication/association procedure 920 may be similar in some respects to the initial association procedure 600 illustrated in FIG. 8. A successful initial authentication/association procedure 920 generates a PMK that is provided to the non-AP MLD 902 and to the first AP MLD 904 through a participating AP 914. The PMK is stored by the non-AP MLD 902. The PMK is used to generate PMK-R0s 926 and 928. The first AP MLD 904 sends the PMK in a message 922 to the WLAN controller 910. The WLAN controller 910 uses the PMK to generate the PMK–R0 926, and the non-AP MLD 902 uses the PMK to generate the PMK–R0 928. In some examples, the PMK-R0s 926 and 928 may be generated by the WLAN controller 910 and the non-AP MLD 902 using the KDF hash-length functions:

$PMK\text{-}R0=KHL(PMK,SSID,c,B,\ldots)$.

The non-AP MLD 902 and the first AP MLD 904 may perform a 4-way handshake 924 to exchange additional keys, including keys (PTK and GTK) that can be used to secure data traffic. The WLAN controller 910 also generates PMK-R1 s for APs associated with the WLAN controller 910. For example, the WLAN controller 910 may provide PMK-R1 s to the AP-MLDs 904 and 906. The PMK-R1 s are generated using the PMK–R0 generated for the non-AP MLD 902 and the KDF hash-length function:

$PMK\text{-}R1[B,a_n]=KHL(PMK\text{-}R0,a_n,B,\ldots)$, where an represents the address or identifier of an AP MLD 904, 906.

The PMK-R1 s enable each AP MLD 904, 906 to identify the non-AP MLD 902 during a mobility event that causes the non-AP MLD 902 to request reassociation, and to provide a basis for responding to a reassociation request received from the non-AP MLD 902. In some reassociation examples, at some point in time after the non-AP MLD 902 has initially established a connection with the AP MLD 904, a STA 912 (with address b2) in the non-AP MLD 902 attempts to re-associate with the network through the second AP MLD 906. For example, the non-AP MLD 902 may send an authentication request message 930 to the second AP MLD 906, which may be received by an AP 916 of the second AP MLD 906.

In the illustrated example, the WLAN controller 910 resides in or can be accessed through the first AP MLD 904, and the second AP MLD 906 sends a message 932 through the first AP MLD 904 requesting the keys needed to authenticate the non-AP MLD 902. An AP 914 in the first AP MLD 904 receives the message 932 and forwards a message 934 to the WLAN controller 910 that includes information provided in the authentication request message 930. The information forwarded in the message 934 includes the address (a2) of the AP 916 in the second AP MLD 906 and the MAC-SAP (B) of the non-AP MLD 902, which serves as the S0KH-ID of the supplicant non-AP MLD 902. The WLAN controller 910 generates a PMK-R1 936 and sends the PMK-R 1 936 in a message 938 directed to the AP 916 in the second AP MLD 906 that received the authentication request message 930. The non-AP MLD 902 generates its version of PMK-R1 942. In some examples, the PMK-R1 s 936 and 942 may be generated using KDF hash-length function:

$PMK\text{-}R1=KHL(PMK\text{-}R0,a2,B,\ldots)$.

The PMK-R1 s 936 and 942 may be used to secure communication between the non-AP MLD 902 and the second AP MLD 906.

The second AP MLD 906 may send an authentication response message 940 to the non-AP MLD 902. The non-AP MLD 902 may then send a reassociation request message 944 to the second AP MLD 906 that includes information provided in the authentication response message 940 and in the authentication request message 930. The non-AP MLD 902 may then receive a confirmation of reassociation in a reassociation response message 946 received from the second AP 906, and based on the confirmation, may then use the PMK-R1 s 936 and 942 to generate corresponding PTKs and GTKs that permit data flow 948 between the non-AP MLD 902 and the second AP MLD 906.

In some aspects of the disclosure, the fast BSS transition for MLO-capable devices illustrated in FIG. 9 can support systems which include AP MLDs 904 and 906 and one or more non-MLO APs such as the legacy AP 808 illustrated in FIG. 8. A legacy AP 808 that is coupled to or managed by the WLAN controller 910 may be configured to receive a PMK-R1 from the WLAN controller 910 that is calculated from the addresses of the MAC-SAP (B) of the non-AP MLD 902 and the address (L) of the legacy AP 808. The address information may be received by the WLAN controller 910 in a manner similar to that illustrated in relation to the authentication request message 930.

Figure 10:
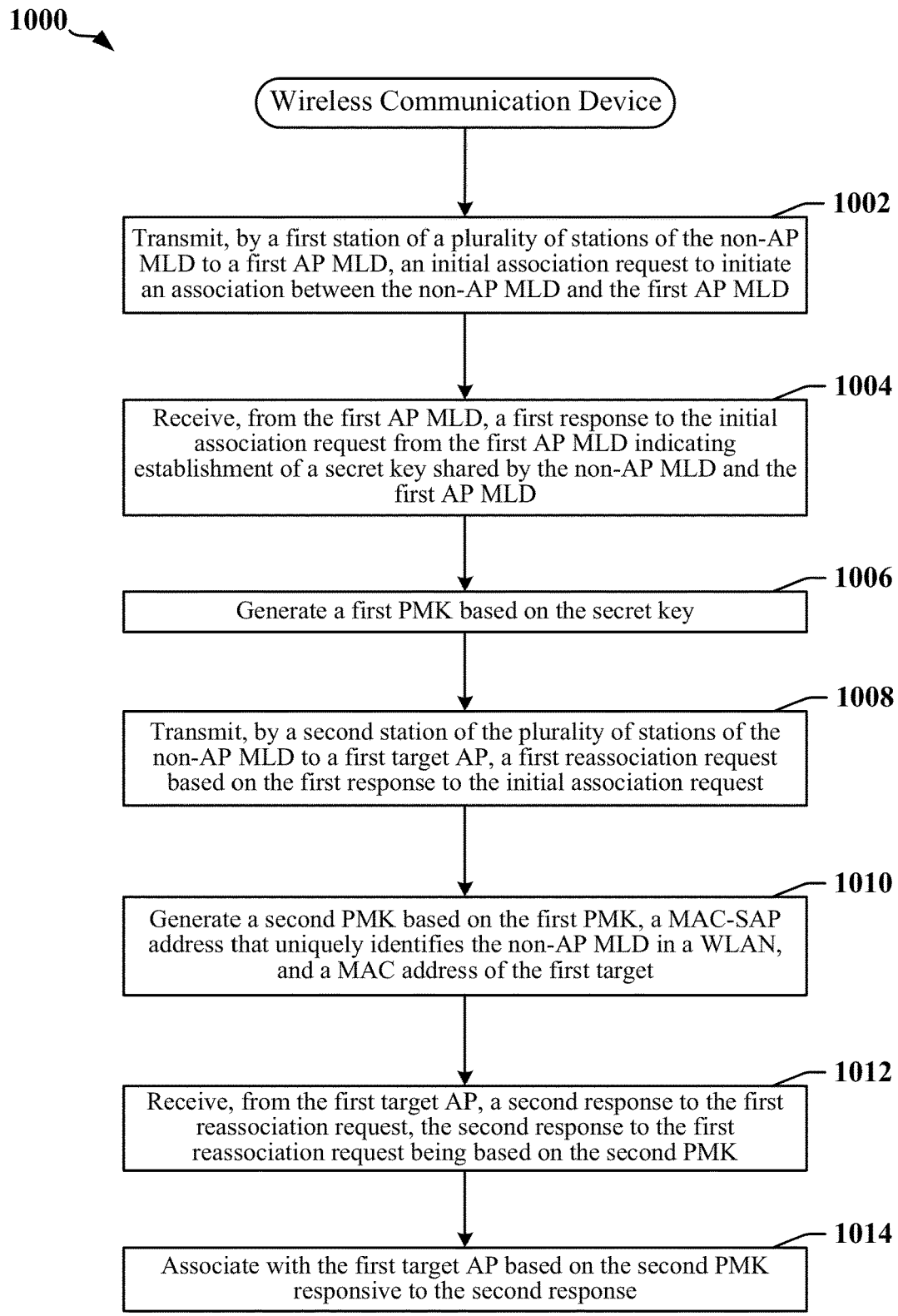
FIG. 10 shows a flowchart illustrating an example process that supports wireless communication at a non-AP MLD that supports fast BSS transitions for MLO according to some aspects.

FIG. 10 shows a flowchart illustrating an example process 1000 for wireless communication at a non-AP MLD that supports fast BSS transitions for MLO according to some aspects. The process 1000 may be performed by a processing device operating as or within a non-AP MLD, such as the non-AP MLD 902 of FIG. 9. In some implementations, the process 1000 begins in block 1002 with transmitting, by a first station of a plurality of stations of the non-AP MLD to a first AP MLD, an initial association request to initiate an association between the non-AP MLD and the first AP MLD. In block 1004, the process 1000 proceeds with receiving, from the first AP MLD, a first response to the initial association request from the first AP MLD indicating establishment of a secret key shared by the non-AP MLD and the first AP MLD. In block 1006, the process 1000 continues with generating a first PMK based on the secret key. In block 1008, the process 1000 proceeds with transmitting, by a second station of the plurality of stations of the non-AP MLD to a first target AP, a first reassociation request based on the first response to the initial association request. In block 1010, the process 1000 continues with generating a second PMK based on the first PMK, a MAC-SAP address that uniquely identifies the non-AP MLD in a WLAN, and a second address that is a MAC address of the first target AP. In block 1012, the process 1000 proceeds with receiving, from the first target AP, a second response to the first reassociation request, the second response to the first reassociation request being based on the second PMK. In block 1014, the process 1000 continues with associating with the first target AP based on the second PMK when the second response to the first reassociation request is based on the second PMK.

In some examples, the MAC-SAP address differs from a MAC address that uniquely identifies the first station. The MAC-SAP address that may differ from a MAC address that uniquely identifies the second station. The second station may have a MAC address that may differ from a MAC address that uniquely identifies the first station.

The process 1000 includes generating a PTK based on the second PMK, encrypting data to be transmitted to the second AP based on the PTK, and transmitting the encrypted data to the first target AP.

The process 1000 further includes transmitting, by a third station of the plurality of stations of the non-AP MLD, a reassociation request to a second target AP, generating a third PMK based on the first PMK, the MAC-SAP address, and a third address that is a MAC address of the second target AP, receiving, from the second target AP, a third response to the second reassociation request based on the third PMK, and associating with the second target AP based on the third PMK responsive to the third response. The first target AP may be provided in the first AP MLD and the second target AP may be provided in a second AP MLD that differs from the first AP MLD. The first target AP and the second target AP may be provided in the first AP MLD. The third target AP may include a non-MLO-capable AP.

Figure 11:
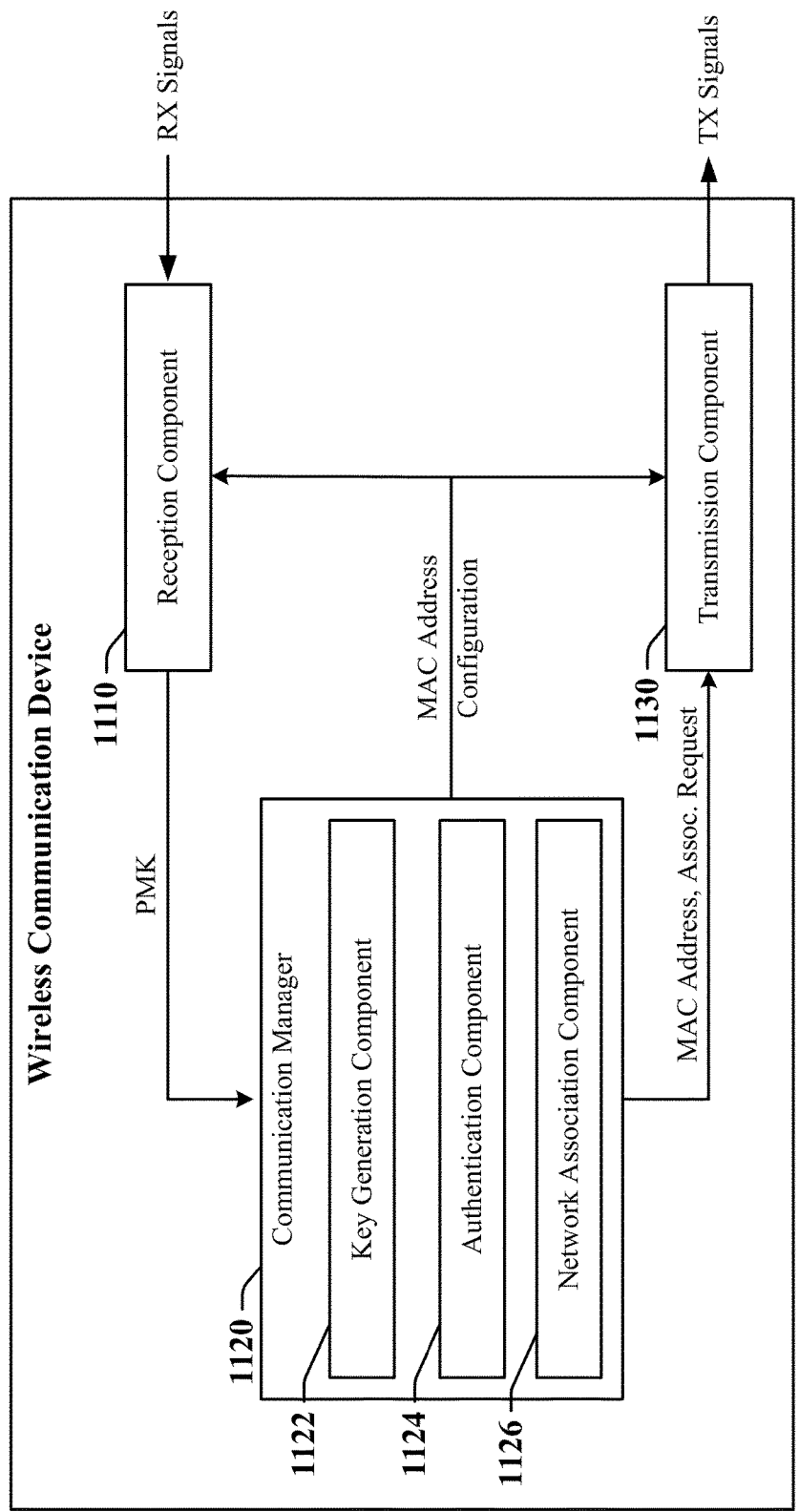
FIG. 11 shows a block diagram of an example non-AP MLD that supports fast BSS transitions for MLO according to some aspects.

FIG. 11 shows a block diagram of an example non-AP MLD 1100 that supports fast BSS transitions for MLO according to some aspects. The non-AP MLD 1100 may be an example implementation of the wireless communication device 300 described above with reference to FIG. 3. In some implementations, the non-AP MLD 1100 is configured to perform any of the processes described above including the process described with reference to FIG. 10. For example, the non-AP MLD 1100 can be implemented in a chip, SoC, chipset, package or device that includes at least one processor (such as the processor 304), at least one modem (for example, a Wi-Fi (IEEE 802.11) modem or a cellular modem such as the modem 302), at least one radio (such as the radio 306) and at least one memory (such as the memory 308).

The non-AP MLD 1100 includes a reception component 1110, a communication manager 1120, and a transmission component 1130. Portions of one or more of the components 1110, 1120 and 1130 may be implemented at least in part in hardware or firmware. In some implementations, at least some of the components 1110, 1120 and 1130 are implemented at least in part as software stored in a memory (such as the memory 308). For example, portions of one or more of the components 1110, 1120 and 1130 can be implemented as non-transitory instructions (or "code") executable by a processor (such as the processor 304) to perform the functions or operations of the respective component.

The reception component 1110 is configured to receive RX signals from an AP MLD. In some implementations, the RX signals may include messages related to authentication and association requests made by the non-AP MLD 1100. The communication manager 1120 is configured to implement fast BSS transition procedures involving communication between the non-AP MLD 1100 and an AP. In some implementations, the communication manager 1120 includes a key generation component 1122 that may generate at least one PMK-R1 from a PMK–R0 that was generated during an initial authentication and association with the WLAN. The communication manager 1120 includes an authentication component 1124 that may exchange messages with the AP during roaming events. In some implementations, the communication manager 1120 includes a network association component 1126 that may be configured to re-associate the non-AP MLD 1100 during a fast BSS transition. The transmission component 1130 is configured to transmit TX signals that may include messages related to authentication and association requests made by the non-AP MLD 1100.

Figure 12:
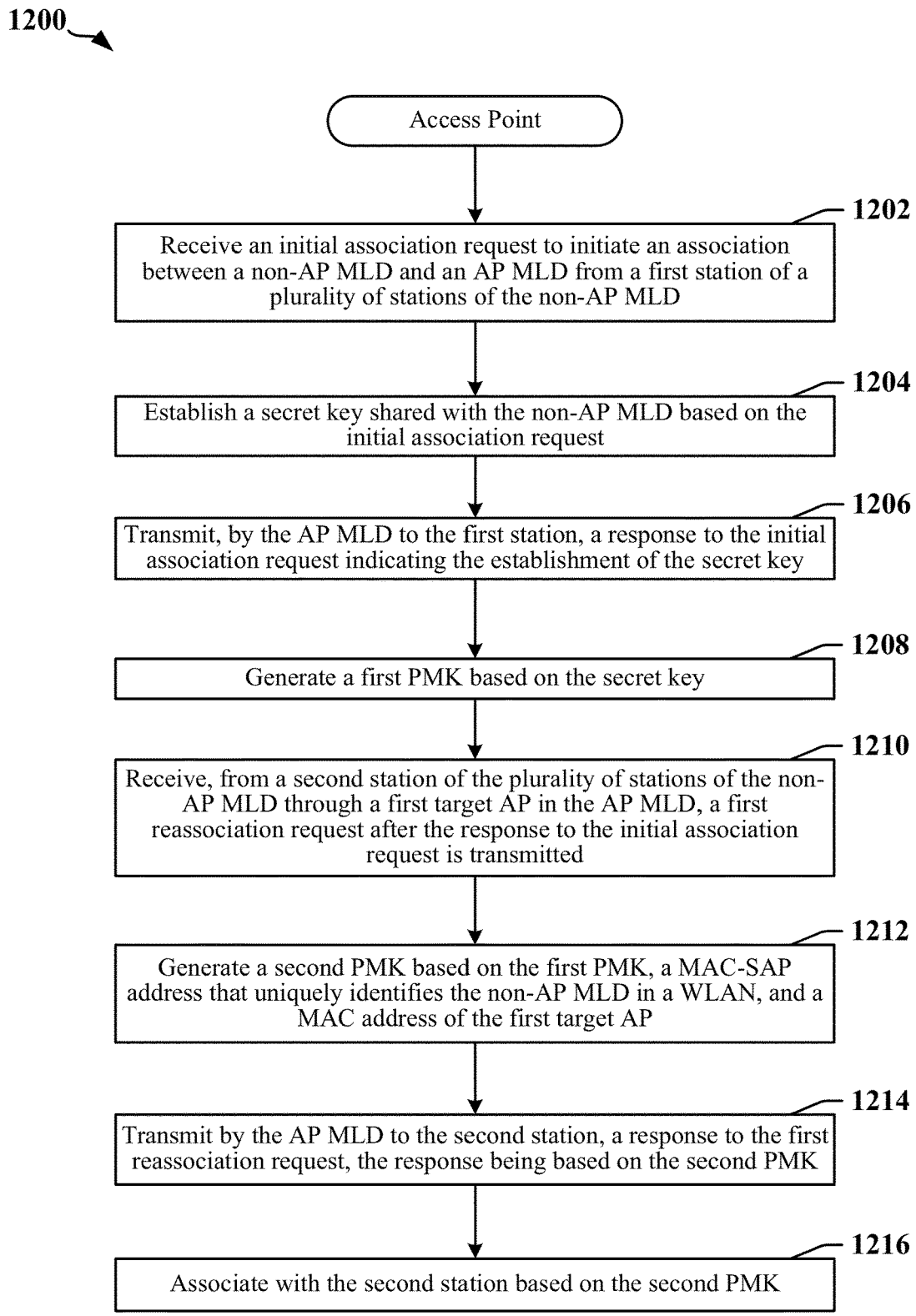
FIG. 12 shows a flowchart illustrating an example process that supports wireless communication at an AP that supports fast BSS transitions for MLO according to some aspects.

FIG. 12 shows a flowchart illustrating an example process 1200 for wireless communication at an AP that supports fast BSS transitions for MLO according to some aspects. In some implementations, the process 1200 may be performed by a processing device operating as or within an AP, such as the AP 102, 400, 710, 804, 904 or 906 of FIGS. 1, 4, 7, 8 and 9. In some implementations, the process 1200 begins in block 1202 by receiving an initial association request to initiate an association between a non-AP MLD and the AP MLD from a first station of a plurality of stations of the non-AP MLD. In block 1204, the process 1200 proceeds with establishing a secret key shared with the non-AP MLD based on the initial association request. In block 1206, the process 1200 continues with transmitting, by the AP MLD to the first station, a response to the initial association request indicating the establishment of the secret key. In block 1208, the process 1200 proceeds with generating a first PMK based on the secret key. In block 1210, the process 1200 continues with receiving, from a second station of the plurality of stations of the non-AP MLD through a first target access point (AP) in the AP MLD, a first reassociation request after the response to the initial association request is transmitted. In block 1212, the process 1200 proceeds with generating a second PMK based on the first PMK, a first address that is a MAC-SAP address that uniquely identifies the non-AP MLD in a WLAN, and a second address that is a MAC address of the first target AP. In block 1214, the process 1200 continues with transmitting, by the AP MLD to the second station, a response to the first reassociation request. The response may be based on the second PMK. In block 1216, the process 1200 proceeds with associating with the second station based on the second PMK.

In some examples, the MAC-SAP address differs from a MAC address that uniquely identifies the first station. The MAC-SAP address may differ from a MAC address that uniquely identifies the second station. The second station may have a MAC address that differs from a MAC address that uniquely identifies the first station. In some examples, the process 1200 includes generating a PTK using the second PMK, using the PTK to encrypt data, encrypting data using the PTK, and transmitting, by the AP MLD to the second station, the encrypted data.

Figure 13:
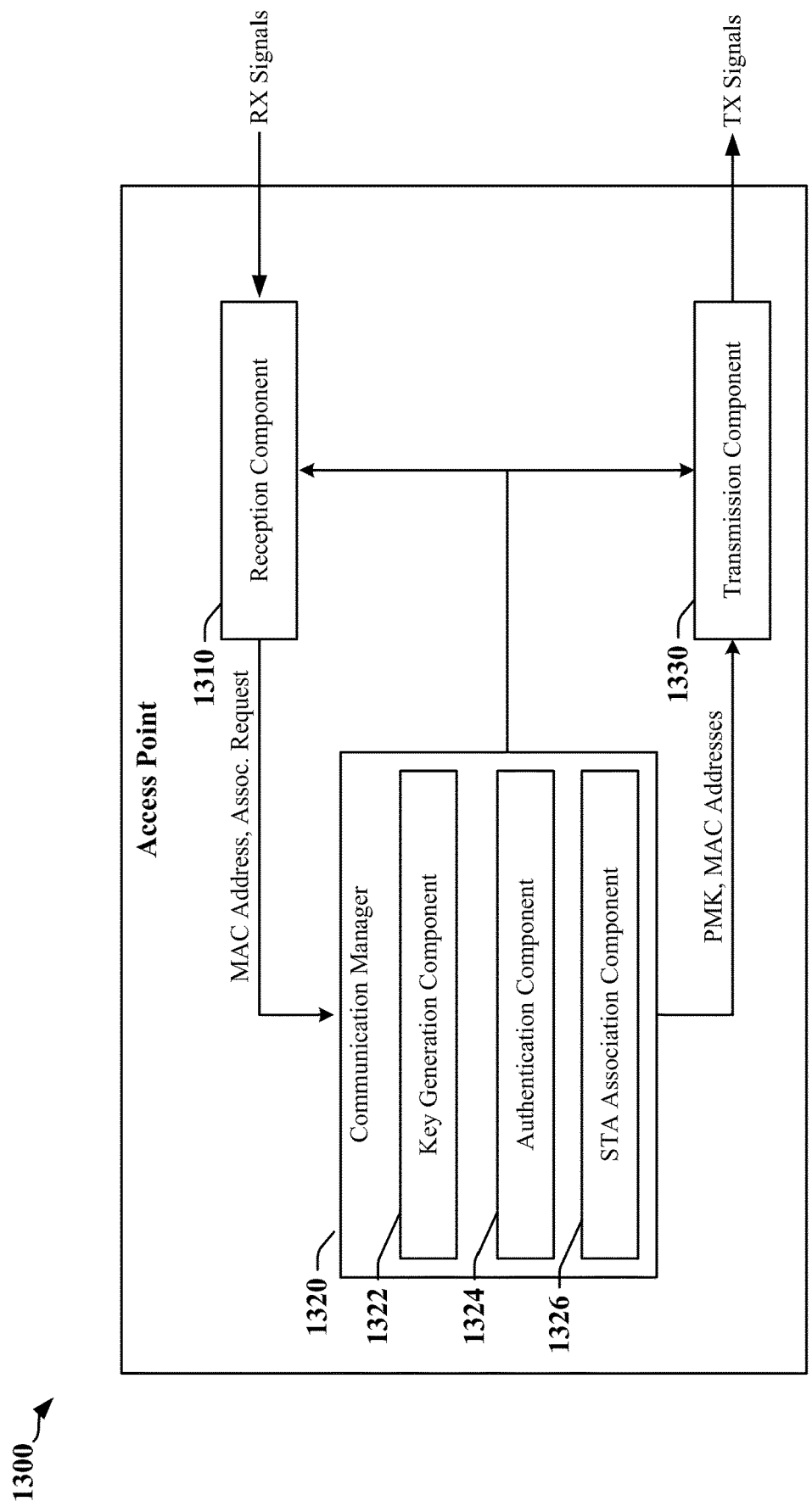
FIG. 13 shows a block diagram of an example access point (AP) multi-link device (AP MLD) according to some implementations.

FIG. 13 shows a block diagram of an example AP 1300 according to some implementations. The AP 1300 may be an example implementation of the wireless communication device 300 described above with reference to FIG. 3. In some implementations, the AP 1300 is configured to perform any of the processes described above including the process described with reference to FIG. 12. In some implementations, the AP 1300 may operate as one of the AP MLDs 904, 906 of FIG. 9. For example, the AP 1300 can be implemented in a chip, SoC, chipset, package or device that includes at least one processor (such as the processor 304), at least one modem (for example, a Wi-Fi (IEEE 802.11) modem or a cellular modem such as the modem 302), at least one radio (such as the radio 306) and at least one memory (such as the memory 308).

The AP 1300 includes a reception component 1310, a communication manager 1320, and a transmission component 1330. Portions of one or more of the components 1310, 1320 and 1330 may be implemented at least in part in hardware or firmware. In some implementations, at least some of the components 1310, 1320 and 1330 are implemented at least in part as software stored in a memory (such as the memory 308). For example, portions of one or more of the components 1310, 1320 and 1330 can be implemented as non-transitory instructions (or "code") executable by a processor (such as the processor 304) to perform the functions or operations of the respective component.

The reception component 1310 is configured to receive RX signals from a wireless network controller or a non-AP MLD. In some implementations, the RX signals may include a PMK, a plurality of addresses of a non-AP MLD, and various requests from the non-AP MLD. The PMK may be generated during authentication of the non-AP MLD by the AP 1300. The communication manager 1320 is configured to authenticate and associate a non-AP MLD and generate keys used to secure communications between the non-AP MLD and the AP 1300. In some implementations, the communication manager 1320 includes a key generation component 1322 that may generate at least one PMK-R1 from the PMK-R0 and use the at least one PMK-R1 to generate a PTK used for communication between the non-AP MLD and the AP 1300. The PMK-R0 may be received in a vector provided by the wireless network controller. In some implementations, the communication manager 1320 includes an authentication component 1324 that may be configured to respond to authentication requests from non-AP MLDs or to identify a PMK-R0 associated with an authenticated non-AP MLD. In some implementations, the communication manager 1320 includes a STA association component 1326 that may be configured to respond to association requests from non-AP MLDs and to associate a non-AP MLD using context generated during a previous initial association.

Figure 14:
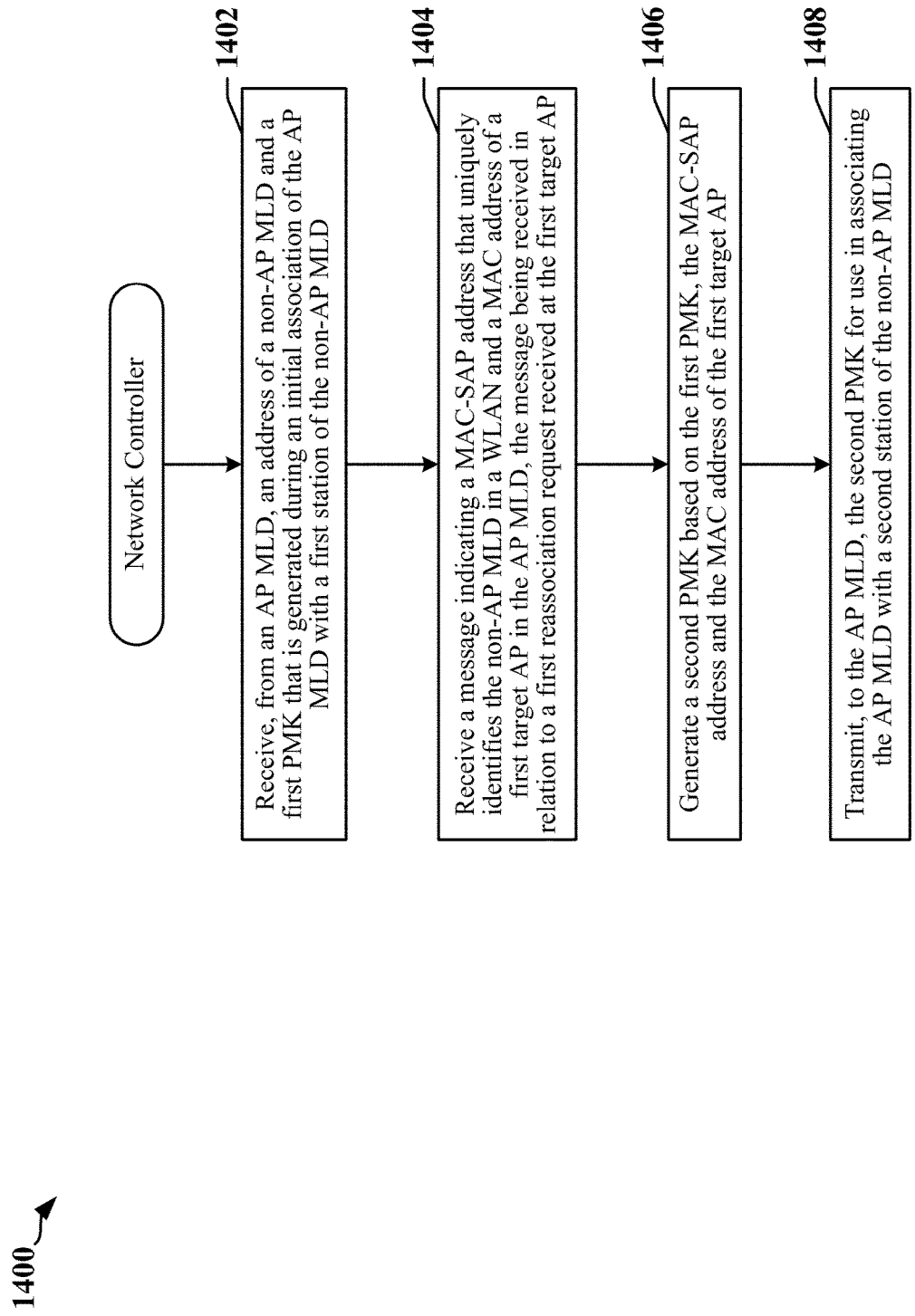
FIG. 14 shows a flowchart illustrating an example process that supports wireless communication at a network controller that supports fast BSS transitions for MLO according to some aspects.

FIG. 14 shows a flowchart illustrating an example process 1400 for wireless communication at a network controller that supports fast BSS transitions for MLO according to some aspects. In some implementations, the process 1400 may be performed by a processing device operating as or within a wireless network controller, such as the WLAN controller 802 or WLAN controller 910 of FIGS. 8 and 9, respectively.

In some implementations, the process 1400 begins in block 1402 by receiving, from an AP MLD, a first PMK and an address of a non-AP MLD. The first PMK may be generated during an initial association of the AP MLD with a first station of the non-AP MLD. In block 1404, the process 1400 proceeds with receiving a message indicating a MAC-SAP address that uniquely identifies the non-AP MLD in a WLAN and a MAC address of a first target AP in the AP MLD. The message may be received in relation to a first reassociation request received at the first target AP. In block 1406, the process 1400 continues with generating a second PMK based on the first PMK, the MAC-SAP address and the MAC address of the first target AP. In block 1408, the process 1400 proceeds with transmitting, to the AP MLD, the second PMK for use in associating the AP MLD with a second station of the non-AP MLD.

In some examples, the MAC-SAP address differs from a MAC address that uniquely identifies the first station. The MAC-SAP address may differ from a MAC address that uniquely identifies the second station. The second station may have a MAC address that differs from a MAC address that uniquely identifies the first station. In some examples, the process 1200 includes generating a PTK using the second PMK, using the PTK to encrypt data, and transmitting encrypted data to the second station.

Figure 15:
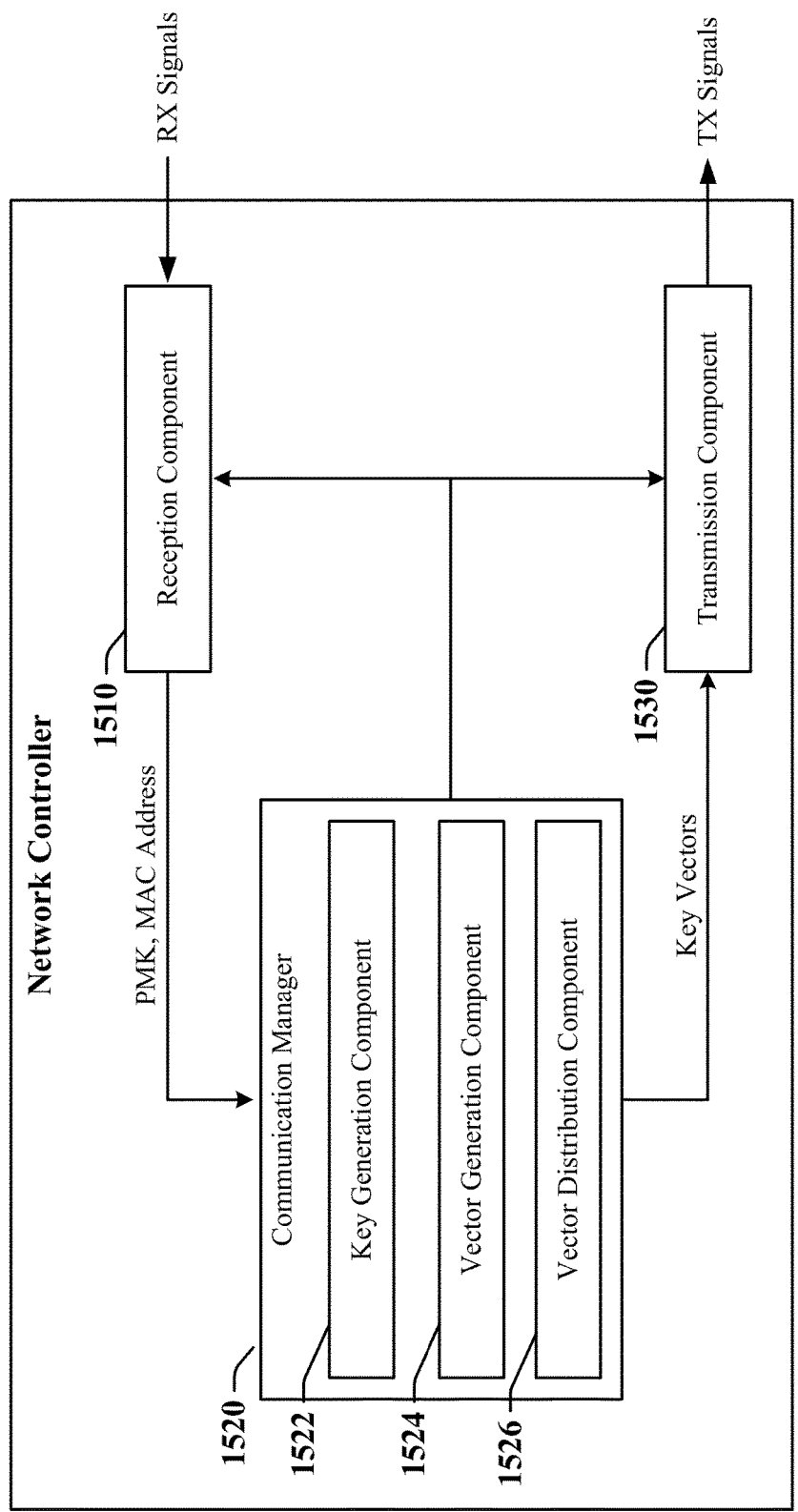
FIG. 15 shows a block diagram of an example network controller that supports MLO according to some aspects.

FIG. 15 shows a block diagram of an example network controller 1500 that supports MLO according to some aspects. The network controller 1500 may be an example implementation of the wireless communication device 300 described above with reference to FIG. 3. In some implementations, the wireless network controller 1500 is configured to perform any of the processes described above including the process described with reference to FIG. 14. In some implementations, the wireless network controller 1500 may operate the WLAN 100 of FIG. 1. For example, the wireless network controller 1500 can be implemented in a chip, SoC, chipset, package or device that includes at least one processor (such as the processor 304), at least one modem (for example, a Wi-Fi (IEEE 802.11) modem or a cellular modem such as the modem 302), at least one radio (such as the radio 306) and at least one memory (such as the memory 308).

The wireless network controller 1500 includes a reception component 1510, a communication manager 1520, and a transmission component 1530. Portions of one or more of the components 1510, 1520 and 1530 may be implemented at least in part in hardware or firmware. In some implementations, at least some of the components 1510, 1520 and 1530 are implemented at least in part as software stored in a memory (such as the memory 308). For example, portions of one or more of the components 1510, 1520 and 1530 can be implemented as non-transitory instructions (or "code") executable by a processor (such as the processor 304) to perform the functions or operations of the respective component.

The reception component 1510 is configured to receive RX signals from an AP MLD. In some implementations, the RX signals may include a PMK and a plurality of addresses of a non-AP MLD. The PMK may be generated during authentication of the non-AP MLD by the AP MLD. The communication manager 1520 is configured to generate and distribute encryption keys used to secure communications between a non-AP MLD and an AP MLD or between a non-AP MLD and a WLAN. In some implementations, the communication manager 1520 includes a key generation component 1522 that may generate at least one PMK–R0 from the PMK. In some implementations, the communication manager 1520 includes a vector generation component 1524 that may use the at least one PMK–R0 to generate vectors for a plurality of AP MLDs, each vector including a second level pairwise master key (PMK-R1) for each address in the plurality of addresses of the non-AP ML. In some implementations, the communication manager 1520 includes a vector distribution component 1526 that may transmit to each AP MLD in the plurality of AP MLDs a vector generated for each AP MLD, where the vector is configured to enable each AP MLD to re-associate the non-AP MLD during a fast BSS transition.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A system comprising:
   a network controller that comprises a first processor that is communicatively coupled with a first modem and a first memory; and
   a first access point (AP) multi-link device (MLD) that comprises a second processor that is communicatively coupled with a second modem and a second memory, wherein the first AP MLD is configured to transmit to the network controller, a first pairwise master key (PMK) and an address of a non-AP MLD, the first PMK being generated during an initial association of the first AP MLD with the non-AP MLD, and
   wherein the network controller is configured to:
      receive a message indicating a medium access control service access point (MAC-SAP) address that identifies the non-AP MLD in a wireless local area network (WLAN) and a medium access control (MAC) address of a target AP device, the message being received in relation to a first reassociation request received at the target AP device; and
      generate a second PMK based on the first PMK, the MAC-SAP address and the MAC address that identifies the target AP device, and
   wherein the first AP MLD is further configured to:
      receive, from a first station of a plurality of stations of the non-AP MLD, an initial association request to initiate an association between the non-AP MLD and the first AP MLD;
      establish a secret key shared with the non-AP MLD based on the initial association request;
      transmit, by the first AP MLD to the first station, a response to the initial association request indicating establishment of the secret key;
      generate the first PMK based on the secret key;
      receive, from a second station of the plurality of stations of the non-AP MLD through the target AP device, the first reassociation request after the response to the initial association request is transmitted;
      generate the second PMK based on the first PMK, the MAC-SAP address, and the MAC address that identifies the target AP device;

transmit, by the first AP MLD to the second station, a response to the first reassociation request that is based on the second PMK; and associate with the second station based on the second PMK.

2. The system of claim 1, wherein the non-AP MLD comprises a third processor that is communicatively coupled with a third modem and a third memory.

3. The system of claim 1, wherein the MAC-SAP address differs from a MAC address that identifies the first station.

4. The system of claim 1, wherein the MAC-SAP address differs from a MAC address that identifies the second station.

5. The system of claim 1, wherein the second station has a MAC address that differs from a MAC address that identifies the first station.

6. The system of claim 1, wherein the first AP MLD is further configured to:

generate a pairwise transient key (PTK) using the second PMK;

encrypt data using the PTK; and transmit the encrypted data to the non-AP MLD.

7. The system of claim 1, wherein the non-AP MLD is configured to:

generate a pairwise transient key (PTK) based on the second PMK;

encrypt data to be transmitted to the target AP device based on the PTK; and transmit the encrypted data to the target AP device.

8. The system of claim 1, wherein the target AP device is an AP MLD.

9. The system of claim 1, wherein the target AP device is a non- MLD AP.

10. A system comprising:

a network controller that comprises a first processor that is communicatively coupled with a first modem and a first memory; and a first access point (AP) multi-link device (MLD) that comprises a second processor that is communicatively coupled with a second modem and a second memory, wherein the first AP MLD is configured to transmit to the network controller, a first pairwise master key (PMK) and an address of a non-AP MLD, the first PMK being generated during an initial association of the first AP MLD with the non-AP MLD, wherein the network controller is configured to:

receive a message indicating a medium access control service access point (MAC-SAP) address that identifies the non-AP MLD in a wireless local area network (WLAN) and a medium access control (MAC) address of a target AP device, the message being received in relation to a first reassociation request received at the target AP device; and generate a second PMK based on the first PMK, the MAC-SAP address and the MAC address that identifies the target AP device, and wherein the non-AP MLD is configured to:

transmit, by a first station of a plurality of stations of the non-AP MLD to the first AP MLD, an initial association request to initiate an association between the non-AP MLD and the first AP MLD;

receive, from the first AP MLD, a first response to the initial association request indicating establishment of a secret key shared by the non-AP MLD and the first AP MLD;

generate the first PMK based on the secret key;

transmit, by a second station to the target AP device, the first reassociation request based on the first response to the initial association request;

generate the second PMK based on the first PMK, the MAC-SAP address, and the MAC address that identifies the target AP device;

receive, from the target AP device, a second response to the first reassociation request the second response to the first reassociation request being based on the second PMK; and associate the non-AP MLD with the target AP device based on the second PMK responsive to the second response.

11. The system of claim 10, wherein the non-AP MLD comprises a third processor that is communicatively coupled with a third modem and a third memory.

12. The system of claim 10, wherein the MAC-SAP address differs from a MAC address that identifies the first station.

13. The system of claim 10, wherein the MAC-SAP address differs from a MAC address that identifies the second station.

14. The system of claim 10, wherein the second station has a MAC address that differs from a MAC address that identifies the first station.

15. The system of claim 10, wherein the first AP MLD is further configured to:

generate a pairwise transient key (PTK) using the second PMK;

encrypt data using the PTK; and transmit the encrypted data to the second station.

16. The system of claim 10, wherein the non-AP MLD is configured to:

generate a pairwise transient key (PTK) based on the second PMK;

encrypt data to be transmitted to the target AP device based on the PTK; and transmit the encrypted data to the target AP device.

17. The system of claim 10, wherein the target AP device is an AP in the first AP MLD.

18. The system of claim 10, wherein the target AP device is an AP of a second AP MLD.

* * * * *